(12) United States Patent
Williamson et al.

(10) Patent No.: US 7,159,937 B2
(45) Date of Patent: Jan. 9, 2007

(54) RECLINING CHAIR

(75) Inventors: John Williamson, Davie, FL (US);
Kurt Anglese, Miami, FL (US)

(73) Assignee: B/E Aerospace, Inc., Wellington, FL (US)

( * ) Notice: Subject to any disclaimer, the term of this patent is extended or adjusted under 35 U.S.C. 154(b) by 0 days.

(21) Appl. No.: 11/388,028

(22) Filed: Mar. 22, 2006

(65) Prior Publication Data
US 2006/0181118 A1 Aug. 17, 2006

Related U.S. Application Data

(62) Division of application No. 10/960,299, filed on Oct. 6, 2004.

(60) Provisional application No. 60/509,402, filed on Oct. 6, 2003.

(51) Int. Cl.
B60N 2/42 (2006.01)
B60N 2/00 (2006.01)

(52) U.S. Cl. .............................. 297/216.13; 297/354.1; 297/468

(58) Field of Classification Search ............ 297/354.1, 297/354.13, 354.12, 216.2, 452.18, 470, 297/471, 478, 216.13, 216.1, 468, 482, 463.1, 297/256.13
See application file for complete search history.

(56) References Cited

U.S. PATENT DOCUMENTS

| 3,129,954 | A | * | 4/1964 | Duero et al. ................. 280/792 |
| 4,375,300 | A |  | 3/1983 | Long et al. |
| 4,527,828 | A | * | 7/1985 | Groce et al. ............. 296/65.09 |
| 4,585,273 | A | * | 4/1986 | Higgs et al. ........... 297/452.18 |
| 4,718,719 | A |  | 1/1988 | Brennan |
| 4,756,502 | A |  | 7/1988 | Egan |
| 5,018,696 | A |  | 5/1991 | Siegrist |
| 5,318,350 | A | * | 6/1994 | Okamoto .................... 297/468 |
| 5,485,976 | A |  | 1/1996 | Creed et al. |
| 5,505,522 | A | * | 4/1996 | Marshall et al. ......... 297/301.4 |
| 5,558,309 | A |  | 9/1996 | Marechal |
| 5,568,960 | A |  | 10/1996 | Oleson et al. |
| 5,570,508 | A | * | 11/1996 | Ress .......................... 29/897.3 |
| 5,636,898 | A |  | 6/1997 | Dixon et al. |
| 5,636,901 | A |  | 6/1997 | Grilliot et al. |
| 5,639,144 | A | * | 6/1997 | Naujokas .................... 297/238 |
| 5,651,514 | A |  | 7/1997 | Grilliot et al. |
| 5,681,091 | A |  | 10/1997 | Larson et al. |
| 5,711,577 | A | * | 1/1998 | Whalen ................... 297/361.1 |
| 5,795,025 | A |  | 8/1998 | Murphy |
| 5,836,547 | A |  | 11/1998 | Koch et al. |
| 5,868,472 | A |  | 2/1999 | Grilliot et al. |
| 5,904,407 | A |  | 5/1999 | Larson et al. |
| 5,954,401 | A |  | 9/1999 | Koch et al. |
| 5,975,636 | A |  | 11/1999 | Koch et al. |
| 6,003,927 | A |  | 12/1999 | Korber et al. |

(Continued)

Primary Examiner—Peter M. Cuomo
Assistant Examiner—Sarah B. McPartlin
(74) Attorney, Agent, or Firm—Gardner Carton & Douglas LLP

(57) ABSTRACT

A reclining chair, in particular a passenger chair, for use in a vehicle such as an aircraft, bus or mobile home. The chair includes a base assembly, a seat frame located above the base assembly, a seat attached to the seat frame, and a seat back connected to the seat frame. In various embodiments, the chair includes features such as an energy absorbing base assembly, an adjustable arm rest, a fully reclining seat back and a seat that increases its angle with respect to the horizontal as the seat back reclines, thereby forcing one back into the chair. The seat and seat back is also capable of achieving a fully horizontal position when the seat back is fully reclined.

20 Claims, 29 Drawing Sheets

U.S. PATENT DOCUMENTS

| | | | |
|---|---|---|---|
| 6,050,629 A * | 4/2000 | Bernhardt et al. | 296/65.01 |
| 6,082,818 A * | 7/2000 | Muller | 297/250.1 |
| 6,179,362 B1 * | 1/2001 | Wisniewski et al. | 296/65.01 |
| 6,305,644 B1 | 10/2001 | Beroth | |
| 6,352,309 B1 | 3/2002 | Beroth | |
| 6,478,256 B1 | 11/2002 | Williamson | |
| 6,494,536 B1 | 12/2002 | Plant | |
| 6,505,890 B1 | 1/2003 | Riley et al. | |
| 6,604,791 B1 | 8/2003 | Chen | |
| 6,619,750 B1 | 9/2003 | Toyota et al. | |
| 6,644,738 B1 | 11/2003 | Williamson | |
| 6,669,143 B1 | 12/2003 | Johnson | |
| 6,669,295 B1 | 12/2003 | Williamson | |
| 6,692,069 B1 | 2/2004 | Beroth et al. | |
| 6,695,406 B1 | 2/2004 | Plant | |
| 6,698,836 B1 | 3/2004 | Veneruso | |
| 6,742,842 B1 | 6/2004 | Dowty | |
| 6,749,266 B1 | 6/2004 | Williamson | |
| 6,799,805 B1 | 10/2004 | Johnson | |
| 6,896,324 B1 * | 5/2005 | Kull et al. | 297/216.1 |
| 2003/0111888 A1 | 6/2003 | Brennan | |
| 2004/0100138 A1 | 5/2004 | Johnson | |

* cited by examiner

RECLINING CHAIR

CROSS-REFERENCE TO RELATED PATENT APPLICATIONS

This patent application is a divisional of U.S. patent application Ser. No. 10/960,299, filed Oct. 6, 2004, which claims the benefit of U.S. Provisional Patent Application No. 60/509,402, filed Oct. 6, 2003, entitled Airplane Passenger Seat, the content of each is incorporated herein by reference in its entirety for all purposes.

FIELD OF THE INVENTION

This invention pertains to a reclining chair in general and, more particularly, to a reclining chair for use as a passenger seat in an aircraft.

BACKGROUND OF THE INVENTION

In order to increase the comfort of a person seated in a chair, manufacturers have long made chairs with a backrest that is capable of reclining several degrees with respect to a vertical position. Today, seats with a reclining backrest are used in homes, offices, and vehicles; including aircraft and buses. While offering greater comfort than a straight back chair, known recliners are limited in that their backrests are, for the most part, not capable of fully reclining to a horizontal position. Although some seats, such as certain aircraft seats, are capable of fully reclining, these seats are constructed so that a space exists between the seat and back cushion when the backrest is fully reclined. Furthermore, the known recliners are incapable of reclining to a fully horizontal position so as to form a flat sleeping surface. For this reason, a chair capable of reclining to a full horizontal position would be an important improvement in the art.

In addition to being able to fully recline to a bed-like sleeping platform, seats that are installed in vehicles such as buses, mobile homes and aircraft must also be able to absorb dynamic loads that may be imparted on the seat as a result of gravitational forces generated by changes in speed and direction of the vehicle. In order to obtain maximum comfort for the occupant in these types of situations, the seat frame must be able to absorb these forces so as to limit their impact on the occupant. Furthermore, under the standards set forth in FAR § 25.562, in order to be certified as airworthy, the seat frame must be able to absorb the forces without separating from the floor of the aircraft in an emergency such as a crash landing. For this reason, a seat that is capable of absorbing dynamic loads imparted on the seat as a result of changes in the direction or speed of a vehicle would be an important improvement in the art.

BRIEF SUMMARY OF THE INVENTION

The invention is directed to a chair comprised of a base assembly, a seat frame located above the base assembly, a seat attached to the seat frame, and a seat back connected to the seat frame. In various embodiments, the seat, in particular an aircraft seat, includes features such as an energy absorbing base assembly, a fully reclining seat back and a seat that increases its angle with respect to the horizontal as the seat back reclines, thereby forcing one back into the seat. The seat and seat back is also capable of achieving a fully horizontal position when the seat back is fully reclined.

These and other advantages of the invention will be apparent from the description of the invention provided herein.

DETAILED DESCRIPTION OF THE INVENTION

Figure 1:
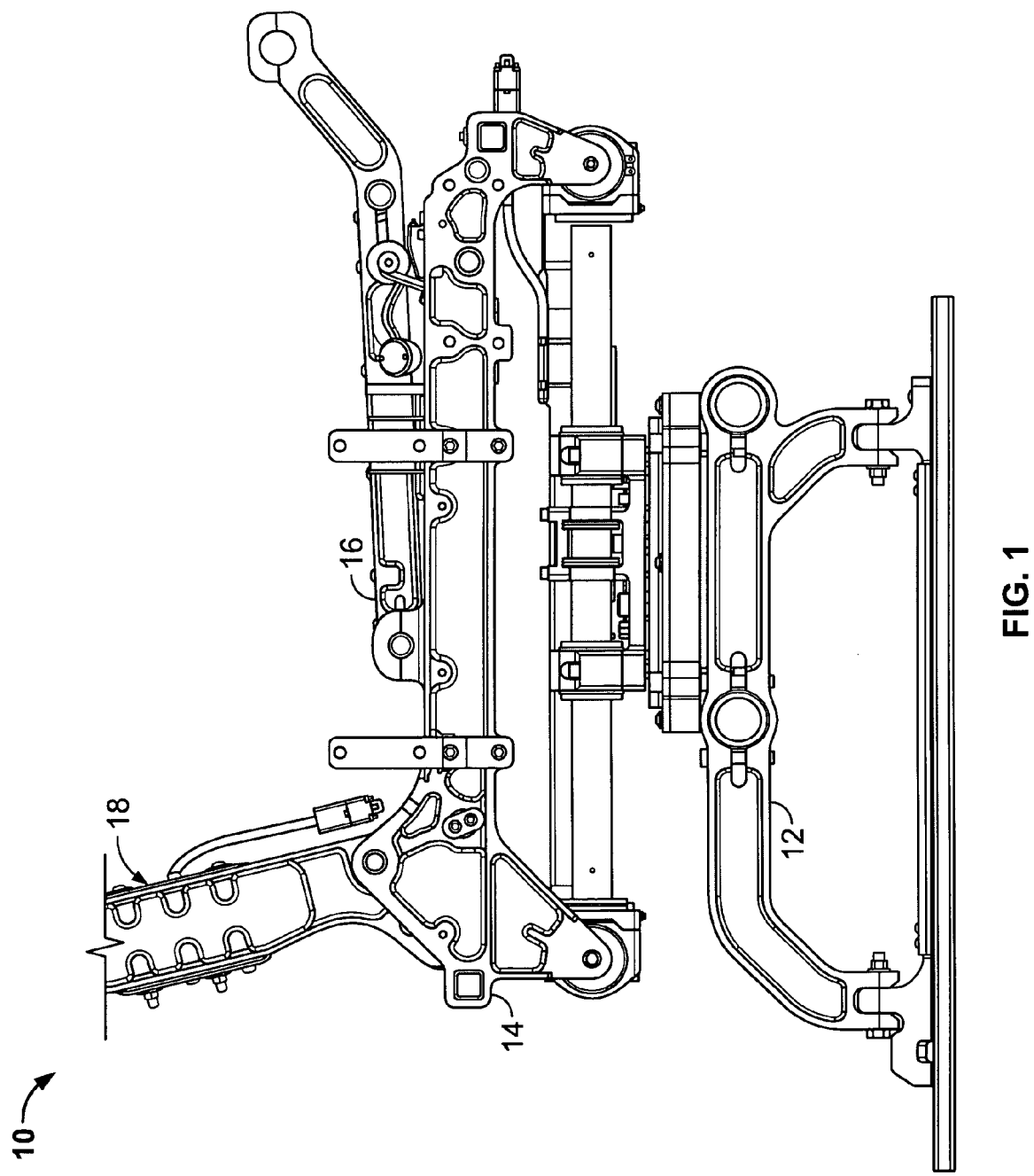
FIG. 1 is a schematic side view showing the internal frame and components of one embodiment of a chair that is the subject of this invention.
Figure 2:
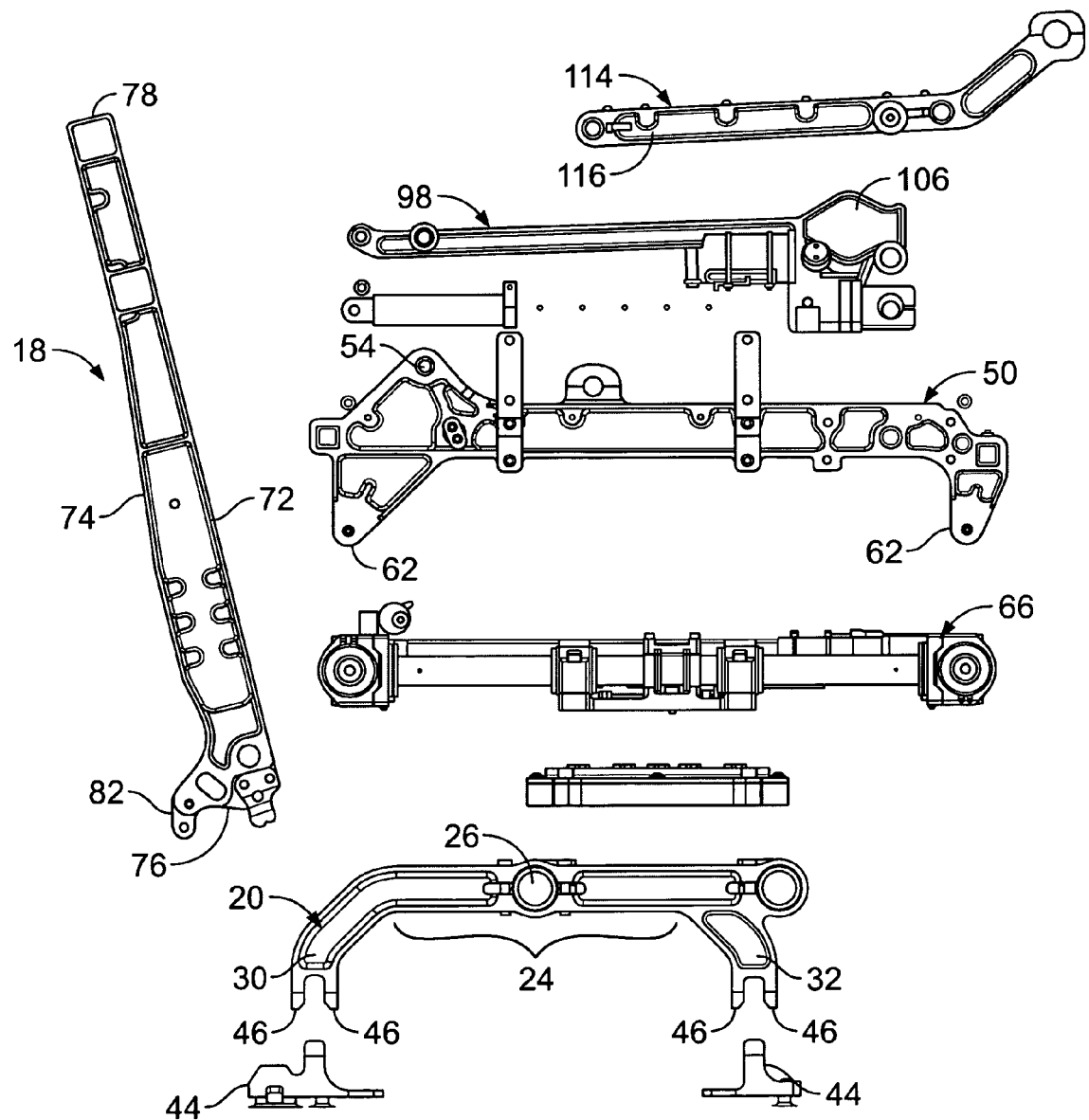
FIG. 2 is an exploded side view showing the components of one embodiment of the chair.

The invention is directed to a reclining chair 10, in particular, a chair 10 for use in a vehicle such as an aircraft or bus. The chair, as shown in FIGS. 1 and 2, is comprised of a base assembly 12, a seat frame 14 located above the base assembly 12, a seat 16 attached to the seat frame 14, and a seat back 18 connected to the seat frame 14.

Figure 3:
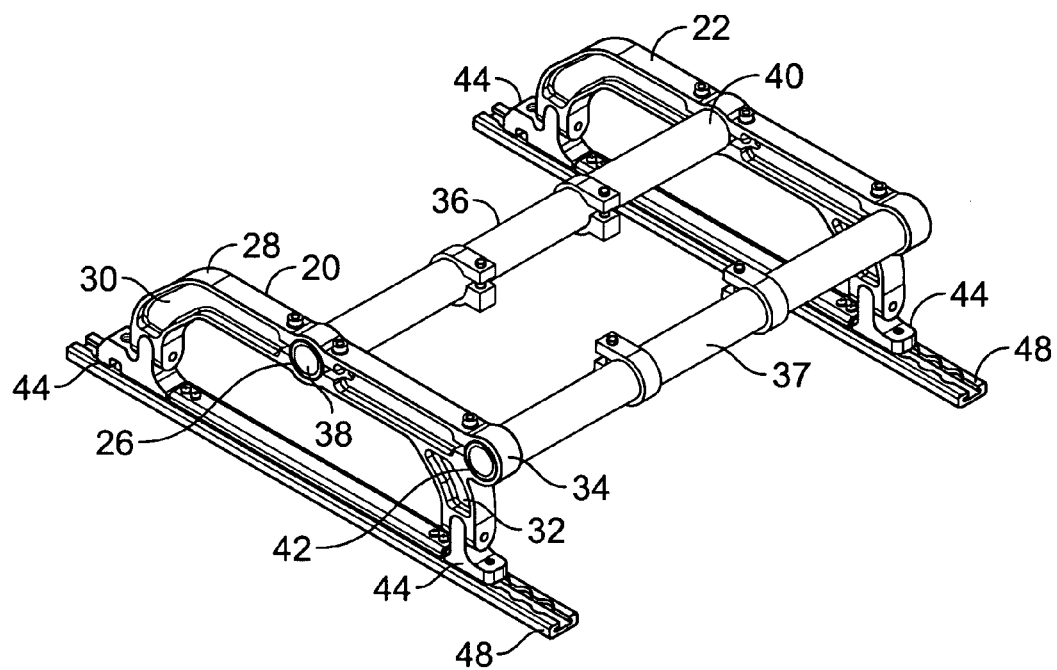
FIG. 3 is a perspective view showing the base assembly of the chair.
Figure 4:
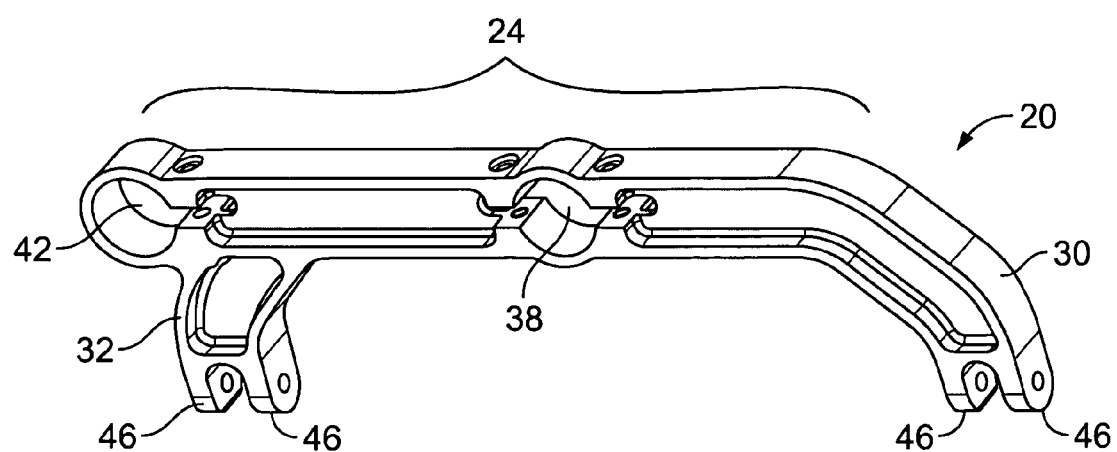
FIG. 4 is a perspective view of a base rail used in conjunction with the base assembly of the chair that is the subject of this invention.

FIG. 3 shows the base assembly 12 which includes a first and second base rail 20, 22 that are spaced apart from and substantially parallel 26 to each other. Each base rail 20, 22 has an elongated portion 24 that defines at least one opening 26. Additionally, each of the base rails 20, 22 has a first end 28 that terminates in a first leg member 30. In one embodiment, the first leg member 30 is angled downward at approximately a 45° angle from the elongated portion 24. A second leg member 32 is also angled downward at approximately 45° from the elongated portion 24 of each base rail 20, 22. This second leg member 32 is located proximal to a second end 34 of the elongated portion 24, as shown in FIG. 4. A tubular mounting bracket 36 connects the first base rail 20 to the second base rail 22, as shown in FIG. 3. The mounting bracket 36 has a first end 38 and a second end 40 with the first end 38 received in the at least one opening 26 in the first base rail 20 and the second end 40 received in the at least one opening 26 in the second base rail 22.

In one embodiment of the invention, each of the base rails 20, 22 has two openings 26, 42. In this version, the first opening 26 is located approximately midway along the length of the base rail 20 and a second opening 42 is located proximal to the second end 34 of the base rail 20.

The first and second leg members 30, 32 of the base rails 20, 22 may be capable of attaching to a floor fitting 44, as shown in FIG. 3. As such, the first and second leg members 30, 32 may terminate in a pair of attachment prongs 46. These attachment prongs 46 may be spaced apart from one another so as to allow for attachment to a fitting 44 secured to the floor of the vehicle as shown in FIG. 3.

As shown in FIG. 3, a first and second tubular mounting bracket 36, 37 may be used to connect the base rails 20, 22. Each of these mounting brackets 36, 37 has a first end 38 and a second end 40. In order to connect the base rails 20, 22, the first and second end 38, 40 of the first tubular mounting bracket 36 is placed in the first opening 26 of the first and second base rail 20, 22, and the first and second end 38, 40 of the second tubular mounting bracket 37 is placed in the second opening 42 of the first and second base rail 20, 22, respectively.

When in operation, the angling of the leg members 30, 32 helps the base rails 20, 22 to absorb energy during a dynamic event. This reduces the structural loading on the base rails 20, 22 during pitch and roll, thereby helping to reduce aircraft floor warping in the event of a major dynamic load.

Furthermore, the prongs 46 of the leg members 30, 32 in one embodiment allow the base rail to be attached to an articulating foot fitting similar to the type disclosed in U.S. patent application Ser. No. 10/944,487, filed Sep. 17, 2004, entitled Attachment Assembly for Mounting a Seat to the Floor of a Vehicle, the entire content of which is incorporated herein by reference. This also helps the base rails 20, 22 to absorb dynamic loads by allowing the rail 20, 22 to rotate slightly with respect to the floor of the vehicle in the event of an abrupt stop caused by an emergency or crash.

In yet another version, the first and second leg members 30, 32 are attached to the elongated portion 24 of the base rail 20. In still another version, the second leg member 32 extends from the second end 34 of the base rail 20.

Figure 5:
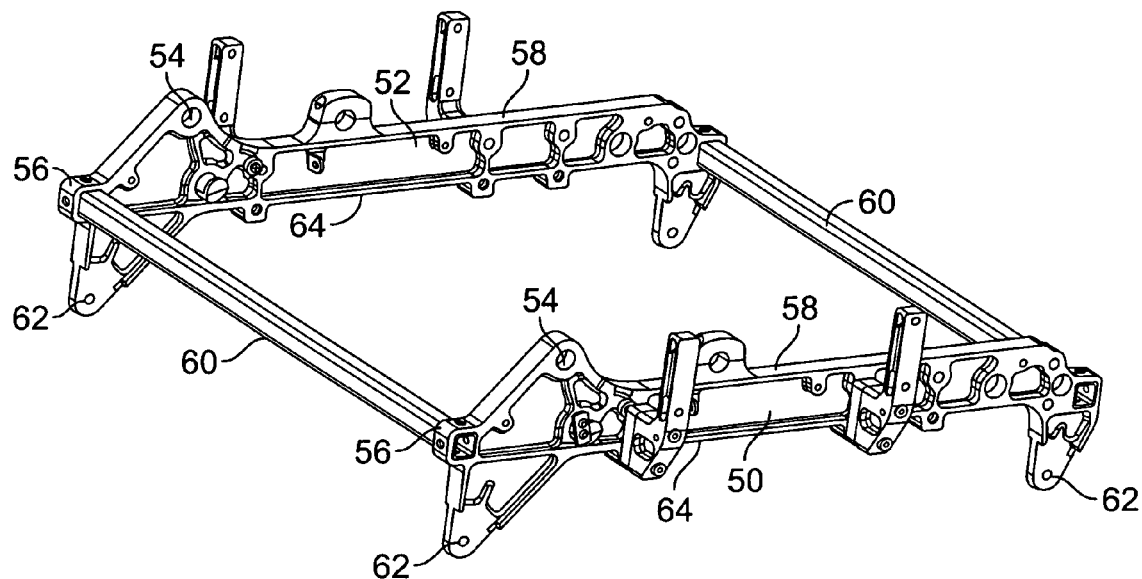
FIG. 5 is a perspective view of the seat frame assembly.
Figure 6:
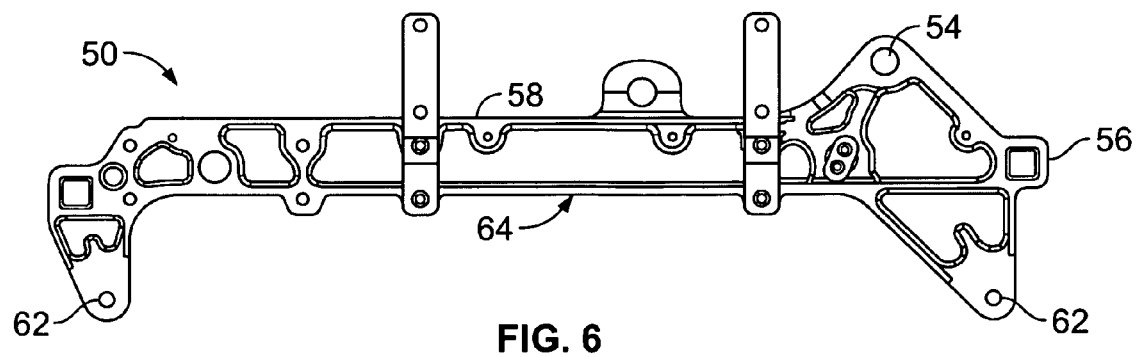
FIG. 6 is a side view of the seat frame side rail.

As shown in FIGS. 1 and 2, a seat frame 14 is located above the base assembly 12. As shown in FIG. 5, the seat frame 14 includes elongated first and second side rails 50, 52 that are spaced apart from and substantially parallel to one another. As shown in FIG. 6, a seat back connection point 54 is defined by an aperture or opening in the side rail proximal to a first end 56 of the side rail. This seat back connection point 54 is usually elevated with respect to a top edge 58 of the side rail 50, and at least one connection bracket 60 connects the first side rail 50 to the second side rail 52. Attachment points 62 used to connect the seat frame 14 to the chair 10 may be located proximal to each of the side rails 50, 52. These attachment points may be displaced downward from a bottom edge 64 of the side rail 50, as shown in FIGS. 5 and 6.

When in use, the seat frame 14 is positioned above the base assembly 12, as shown in FIGS. 1 and 2. The seat frame 14 may be adapted to connect directly with the base assembly 12, or it may be mounted to a tracking assembly 66, as shown in FIGS. 1 and 2. By mounting the seat frame 14 to a tracking assembly 66, the seat frame 14 is capable of moving laterally with respect to the base assembly 12.

Figure 7:
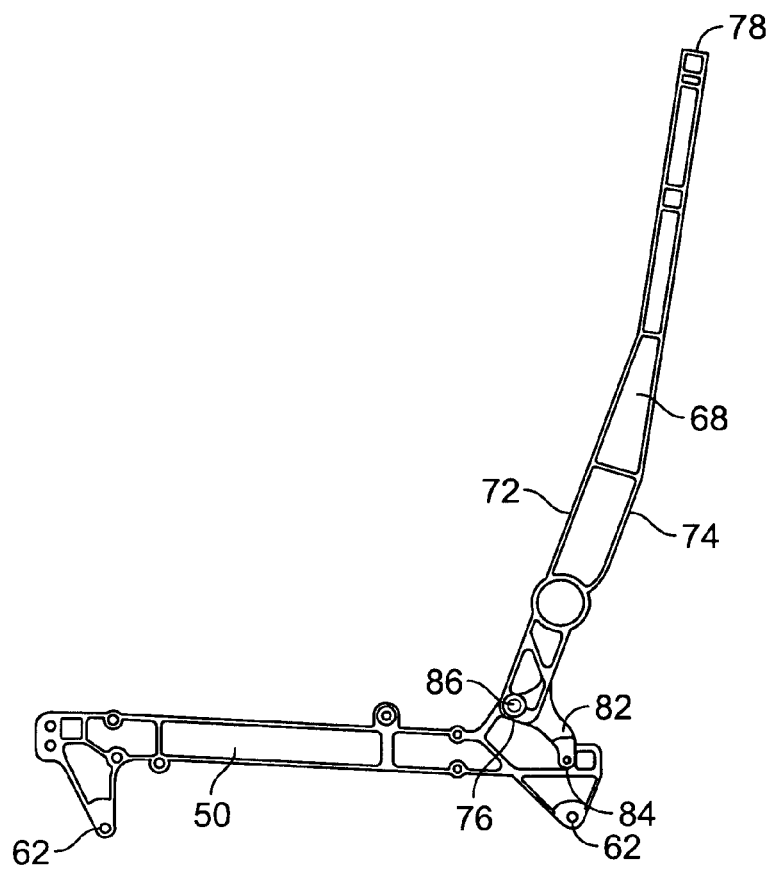
FIG. 7 is a side view of the seat frame and seat back rail with the seat back in a neutral vertical position.
Figure 8:
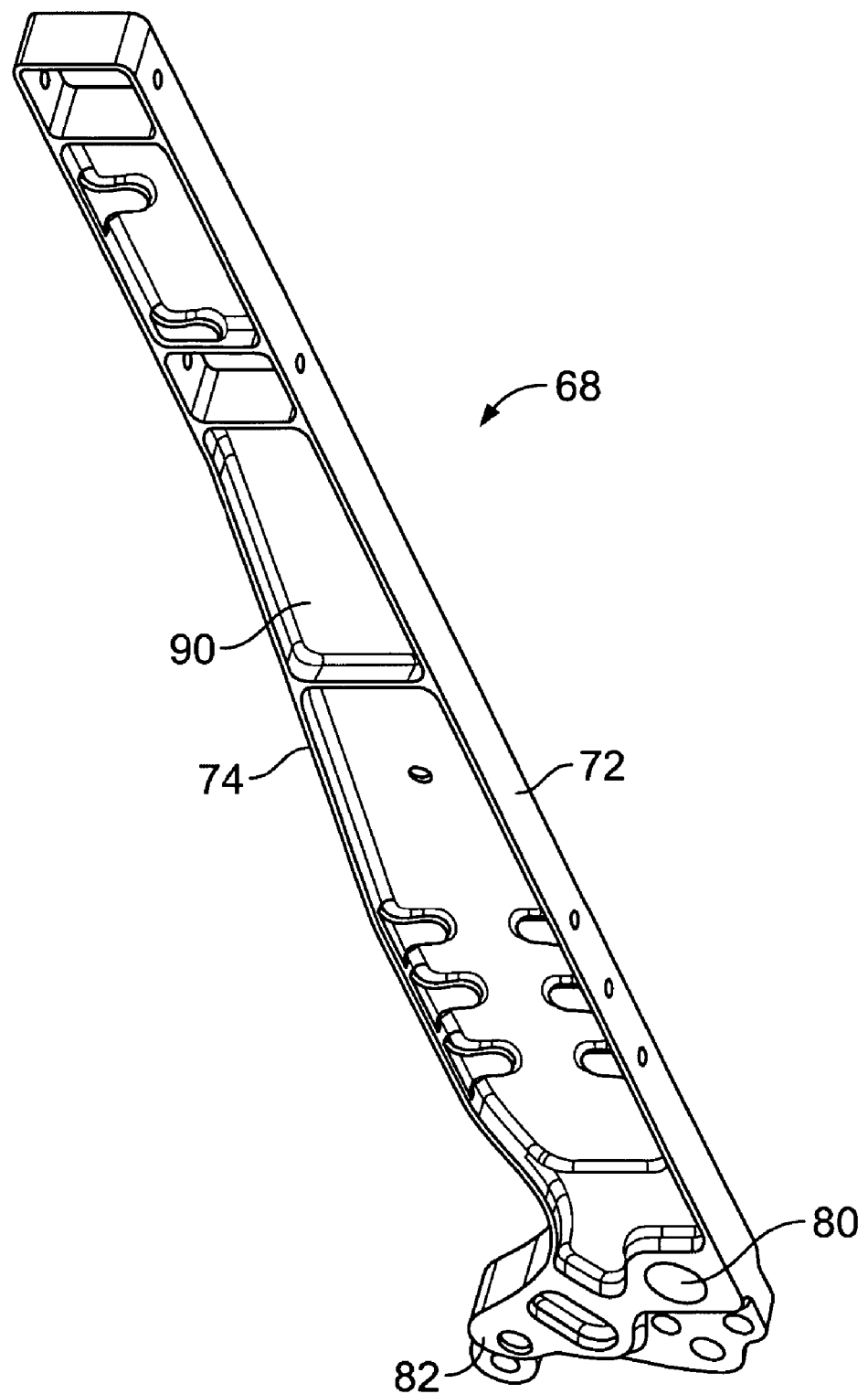
FIG. 8 is a perspective view of the backrest rail.

A seat back 18 is connected to the seat frame 14, as shown in FIG. 7. The seat back 18 includes a first and second backrest rail 68, 70 like the one shown in FIG. 8. The second backrest rail 70 is spaced apart from and substantially parallel to the first backrest rail 68. Each of the backrest rails 68, 70 have a front and back edge 72, 74. A first and second end 76, 78 distal from one another connect the front and back edge, 72, 74 and a pivot point is defined by an aperture or opening 80 proximal to the front edge 72 and first end 76.

Figure 7A:
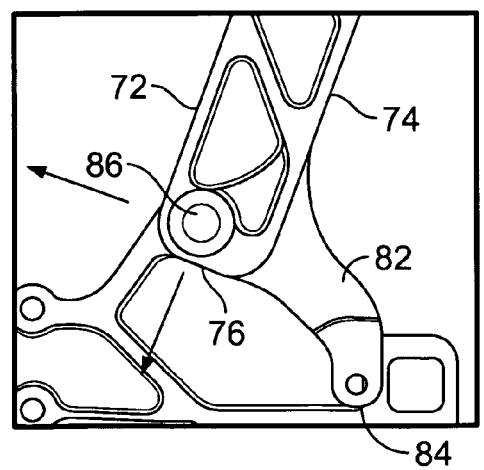
FIG. 7(a) is a close-up side view of the point where the backrest rail of the seat back connects with the side rail of the seat frame.
Figure 9:
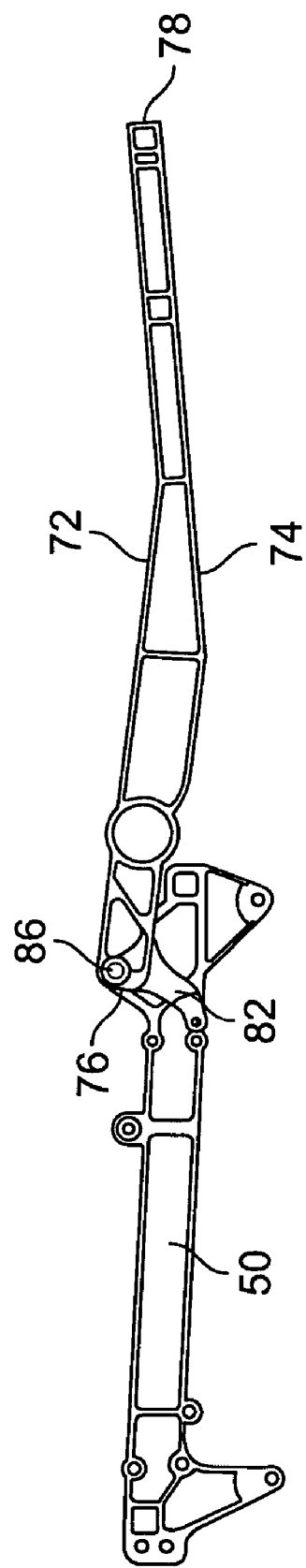
FIG. 9 is a side view showing the seat back in the fully reclined position.
Figure 10:
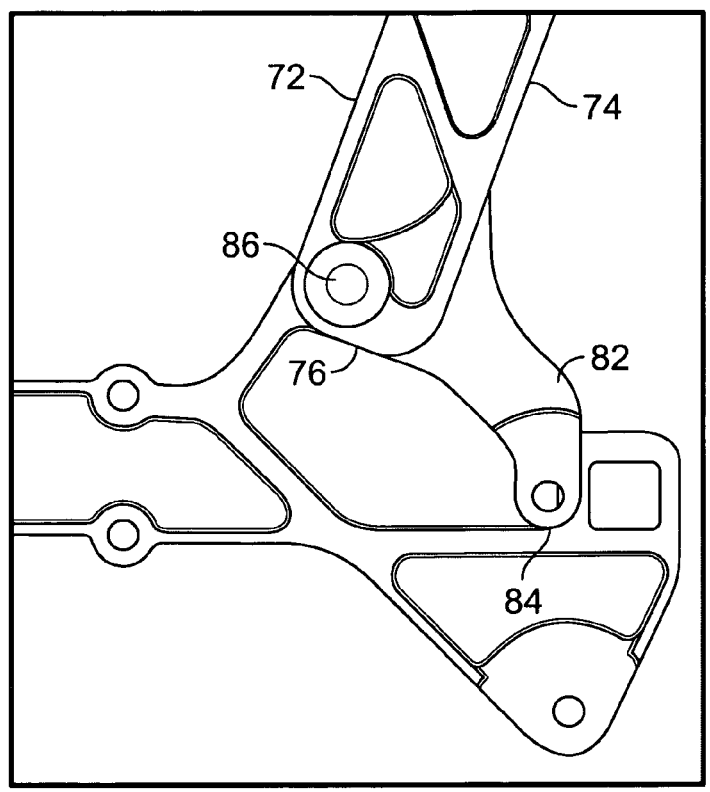
FIG. 10 is a close-up view of the pivot arm when the seat back is in the upright position.
Figure 11:
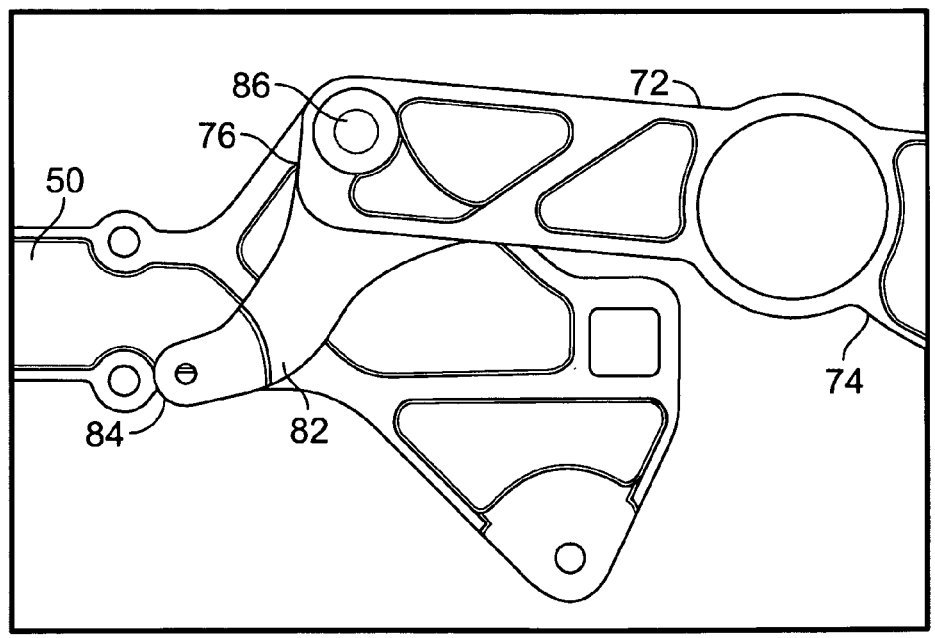
FIG. 11 is a close-up view of the pivot arm when the seat back is in the fully reclined position.
Figure 12:
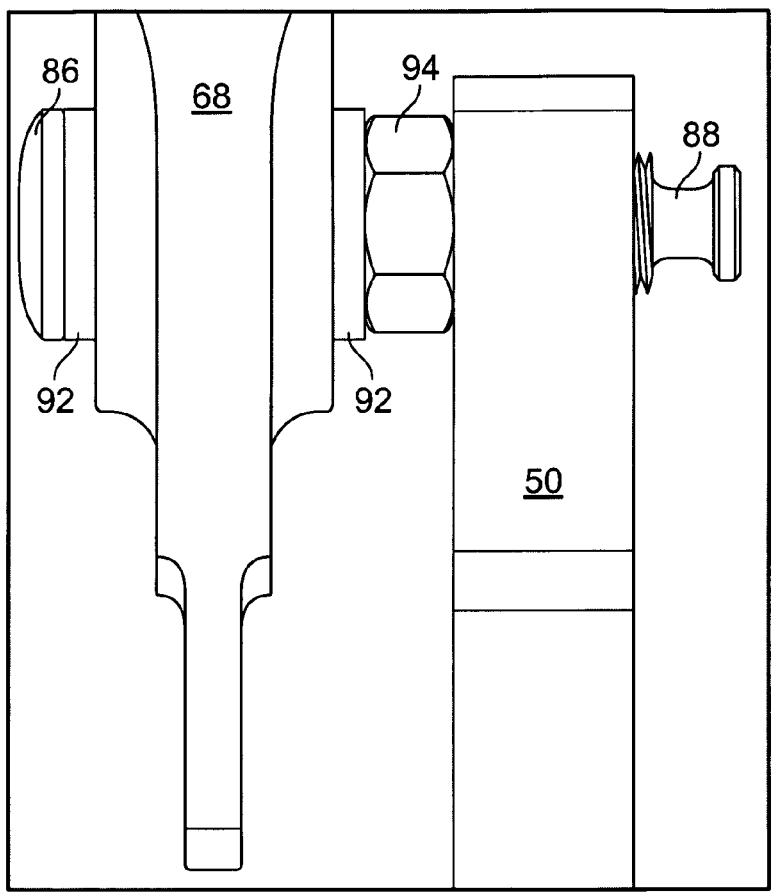
FIG. 12 is a close-up view of the pivot member connecting the backrest rail of the seat back with the side rail of the seat frame.
Figure 13:
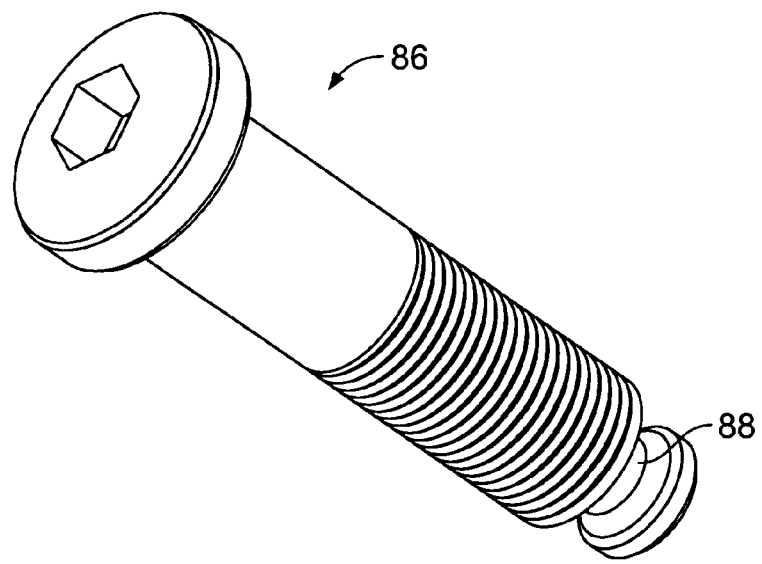
FIG. 13 is a perspective view of the pivot member.
Figure 14A:
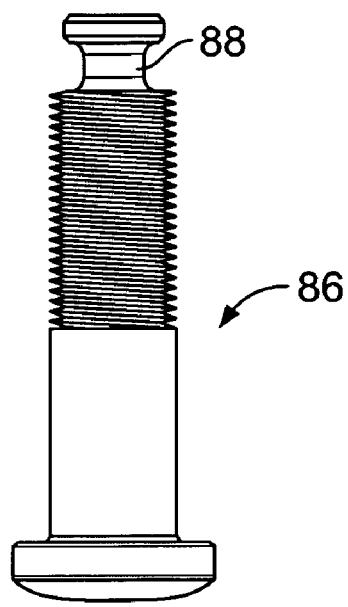
FIG. 14(a) is a side view of the pivot member.
Figure 14B:
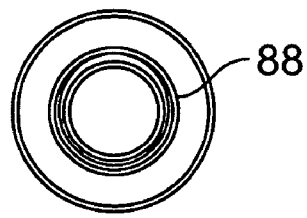
FIG. 14(b) is a bottom view of the pivot member.
Figure 14C:
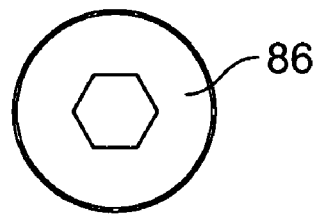
FIG. 14(c) is top view of the pivot member.
Figure 15:
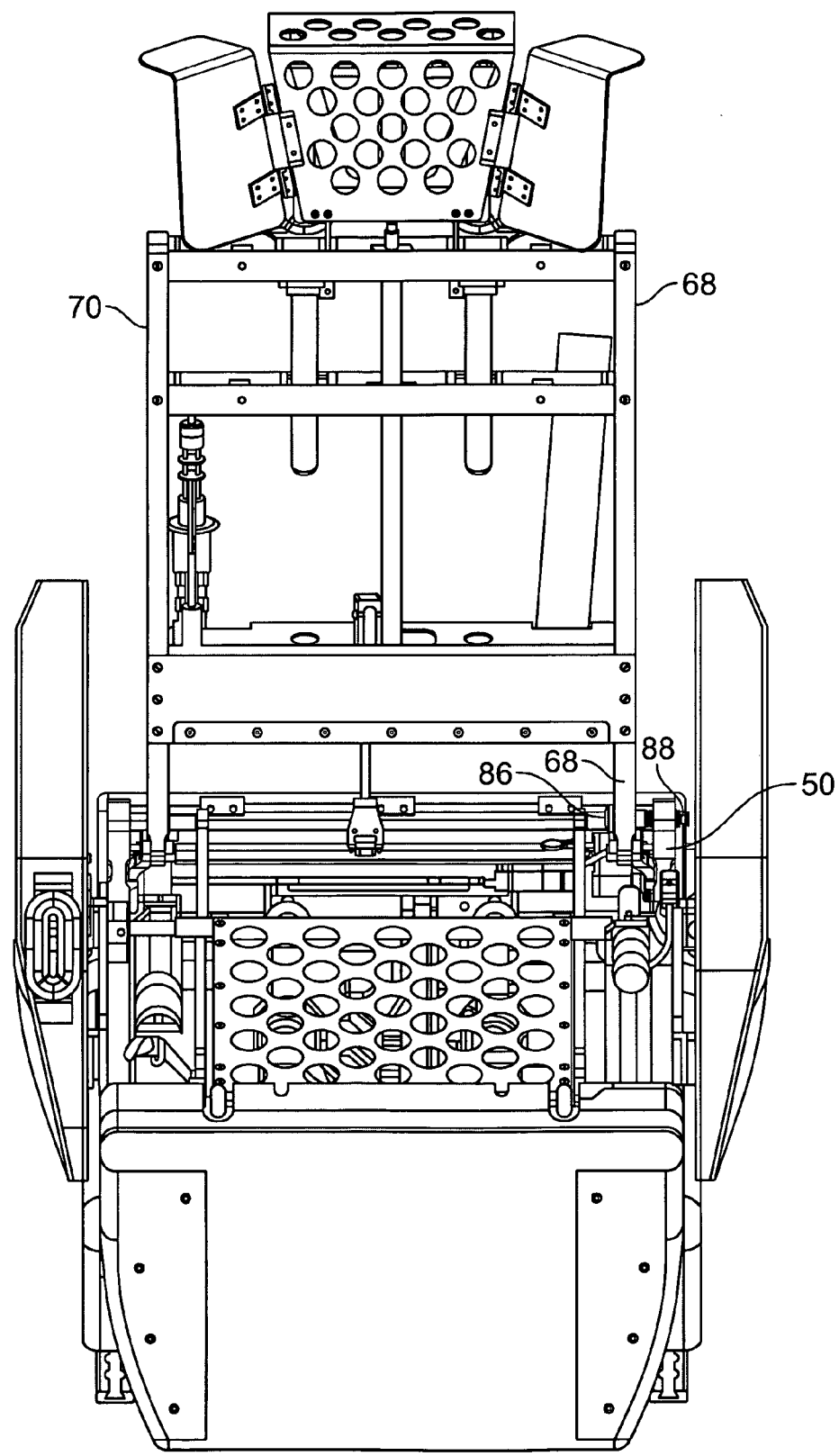
FIG. 15 is a perspective view showing the framework of the chair that is the subject of this invention.
Figure 15A:
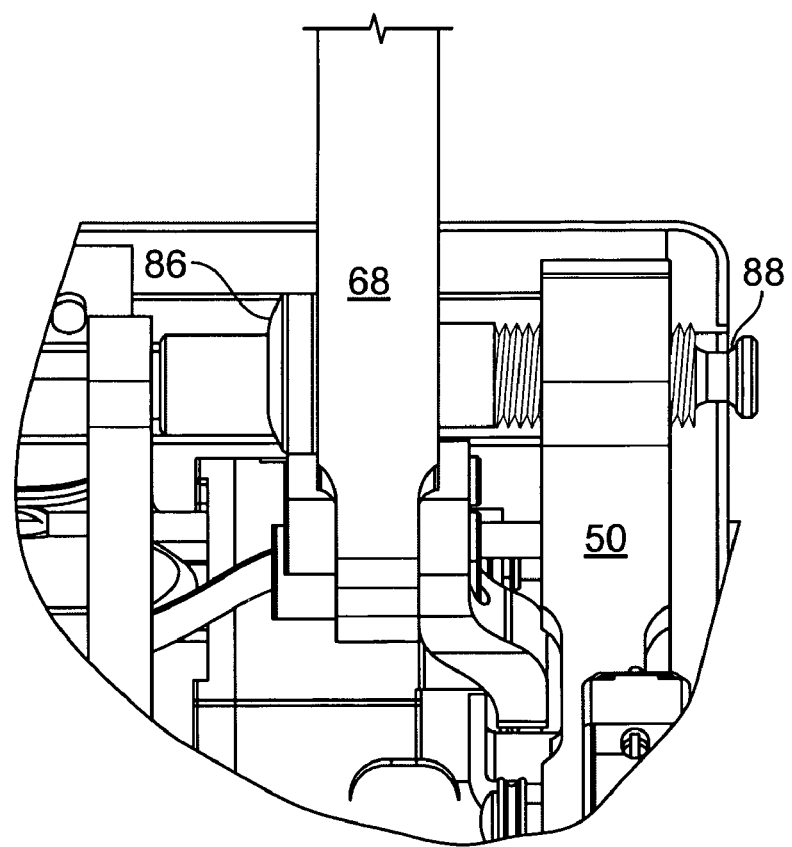
FIG. 15(a) is a close-up view showing the pivot member connecting the backrest rail of the seat back with the side rail of the seat frame.
Figure 16:
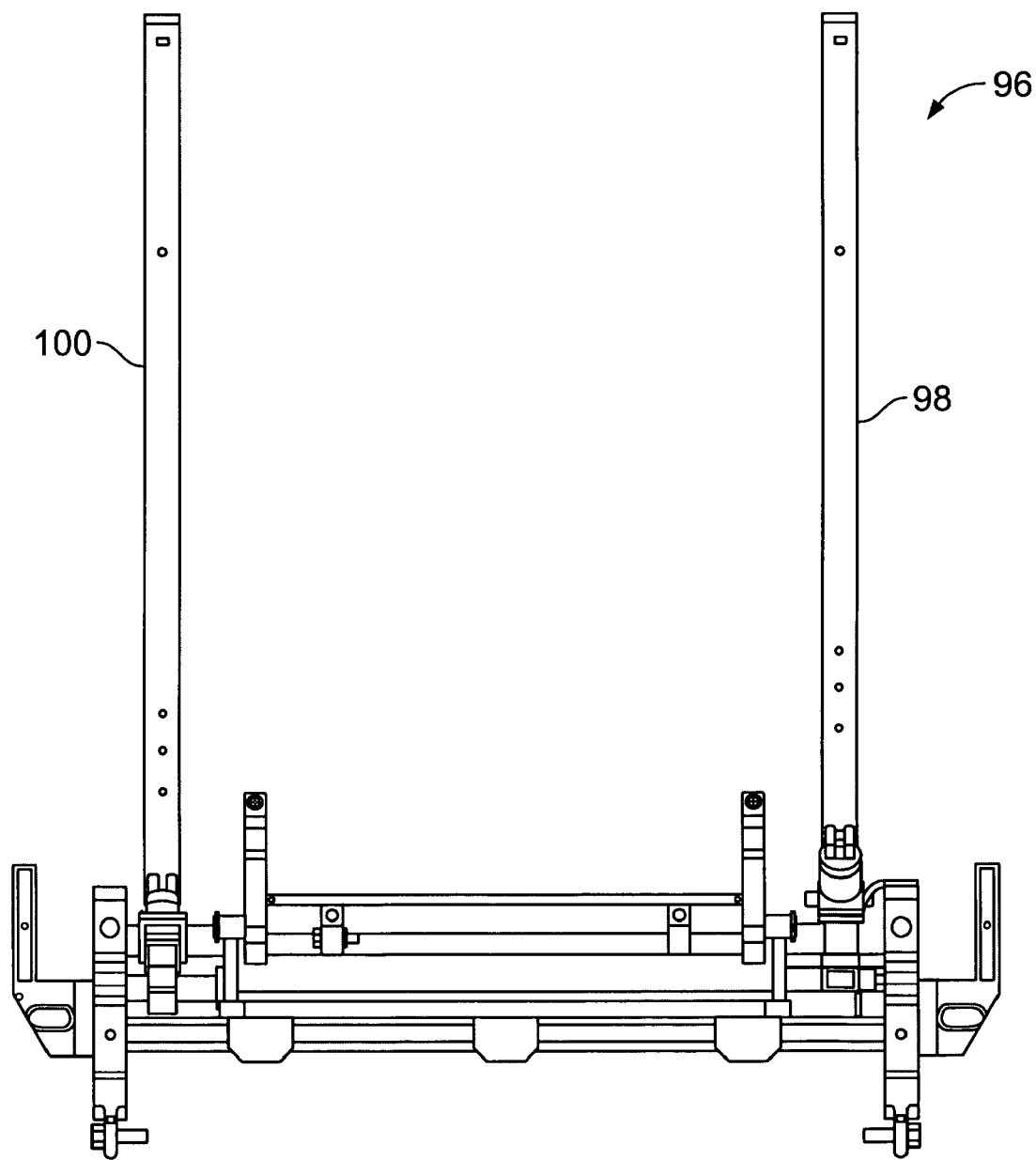
FIG. 16 is a front view of the seat articulator.
Figure 17:
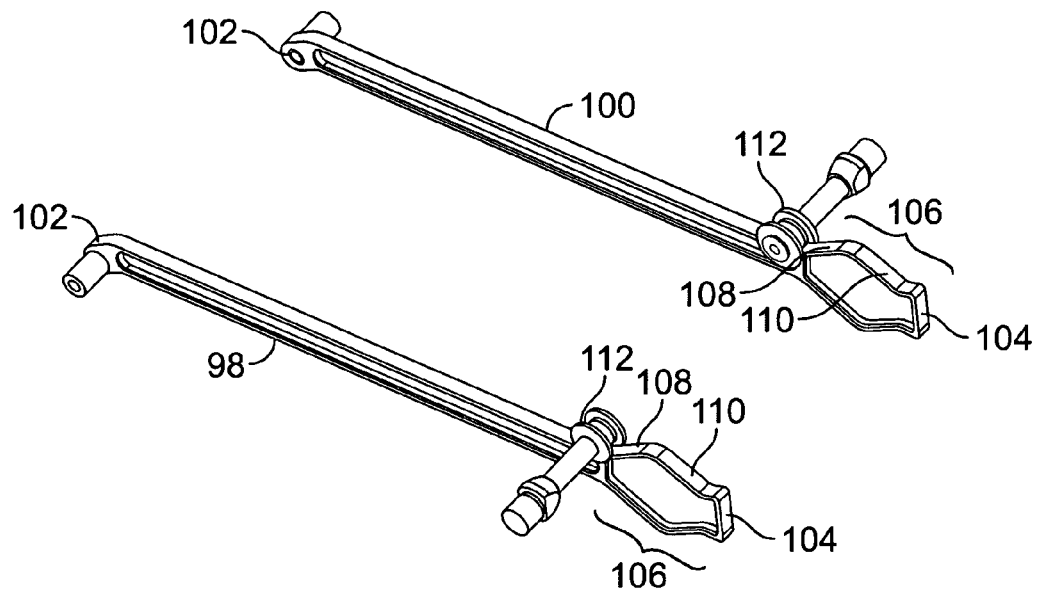
FIG. 17 is a perspective view of the ramp bars of the seat articulator.

As shown in FIGS. 7, 7(a) and 9–11, a pivot arm 82 includes a first portion and a second portion. As best illustrated in FIG. 2, the first portion extends generally perpendicular from the back edge 74 of the seat back 18 and the second portion extends generally perpendicular to the first portion and past the end 76. The pivot arm 82 has an end point 84 that extends below the pivot point 80 of the backrest rail 68 when the seat back 18 is in a substantially vertical position, as shown in FIGS. 7, 7(a) and 10, and forward of the pivot point 80 when the seat back 18 is in a horizontal position, as shown in FIGS. 9 and 11. A pivot member 86 passes through both the opening 80 in the backrest rail 68 and the opening 54 in the side rail 50 of the seat frame 14, as shown in FIG. 12. This pivot member 86, as shown in FIGS. 13 and 14(*a–c*), has a seat belt anchor 88 located at one end. This eliminates the need for a separate seat belt anchor component and additional mounting hardware. The pivot member 86 is installed through the backrest side rail 68 from the inside face 90 of the rail 68. In one version of the pivot member 86, a nylon washer 92 is installed on the pivot member 86 on either side of the backrest rail 68, sandwiching the backrest rail 68, and a jam nut 94 is threaded or otherwise installed onto the threaded (e.g., screw) portion before the pivot member 86 is extended through the seat frame rail 50, as shown in FIG. 12. This leaves the end of the pivot member 86 which serves as the seat belt anchor 88 exposed on the outside of the seat frame side rail 50, as shown in FIGS. 12, 15 and 15(*a*).

In one embodiment of the invention, as shown in FIGS. 15 and 23–26, at least one support beam 150 extends between the first and second backrest rails 68, 70. A torque box 152 may also be positioned between the first and second backrest rails 68, 70, as shown in FIGS. 15 and 23–26.

Figure 27:
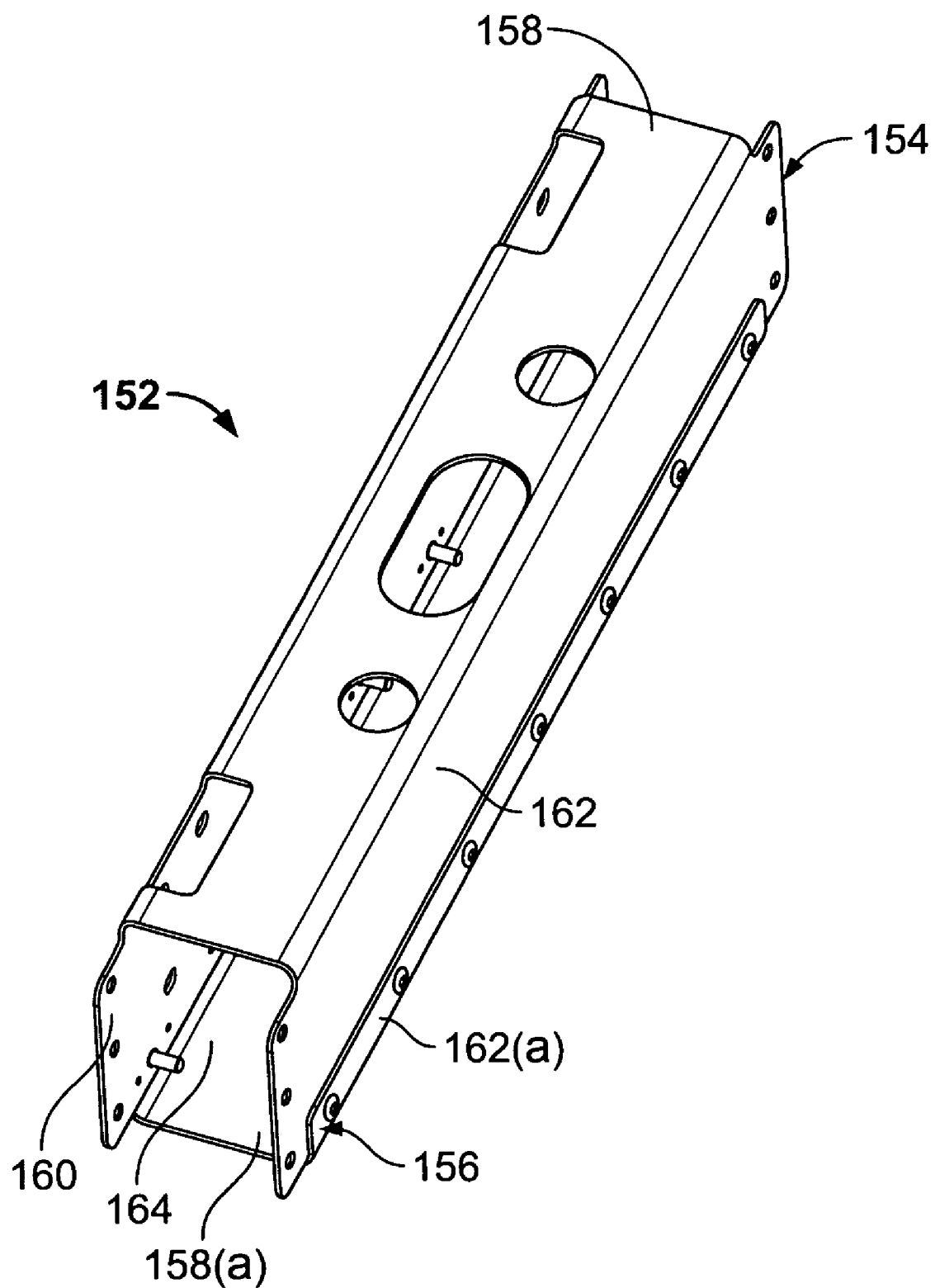
FIG. 27 is a perspective view showing the top side of the torque box.
Figure 28:
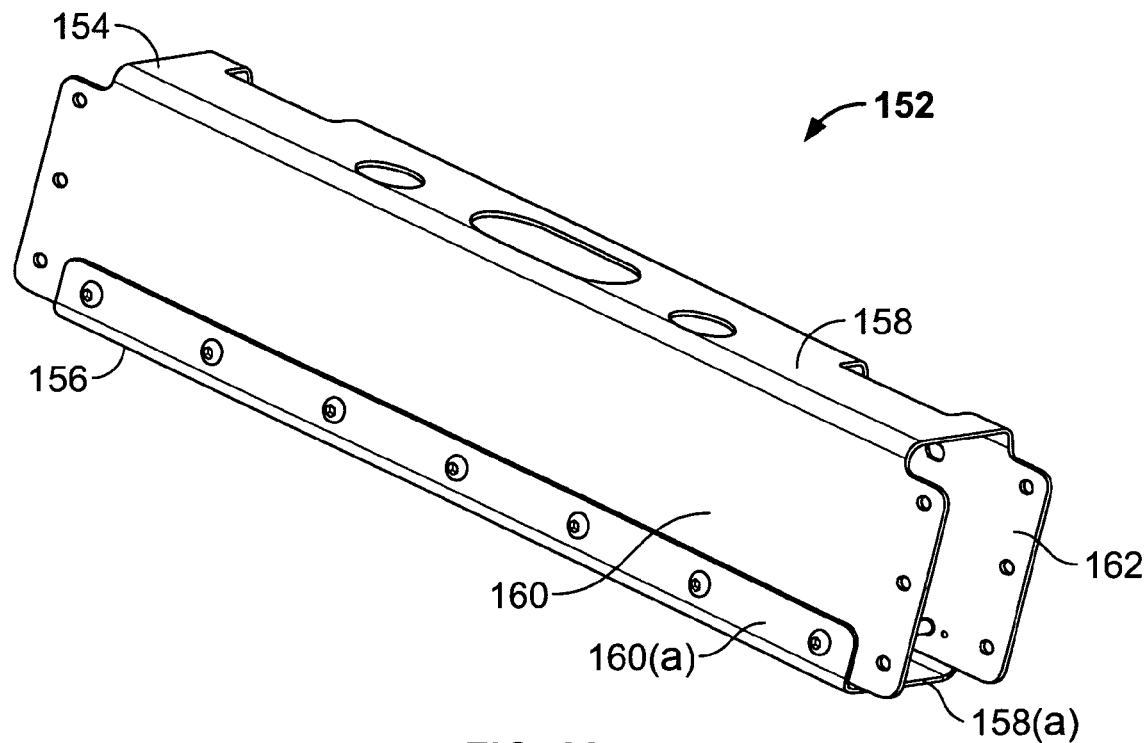
FIG. 28 is a perspective view showing a side panel of the torque box.
Figure 29:
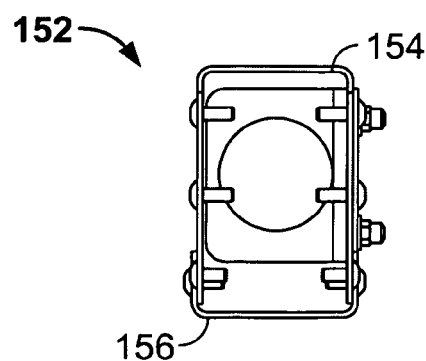
FIG. 29 is a side view of the torque box.

As shown in FIGS. 27–29, the torque box 152 has a rectangular shaped cross section and may include a first and a second section 154, 156 (e.g., square U-shaped channel members), each having at least three sides 158, 158(*a*), 160, 160(*a*), 162, 162(*a*) with a fourth side defined by a channel 164. The first and second sections 154, 156 are positioned opposite each other, as shown in FIGS. 28 and 29, so that two sides 160, 162 of one of the first and second sections 154, 156 are received in the channel 164 of the other one of the first and second sections 154, 156. At least one opening 166 exists in the side 158 of the first section 154 opposite the channel 164 to receive a headrest support bracket 168.

The torque box 152 serves as the primary structural member of the seat back 18. Because of its box shape, the torque box 152 is able to transfer shoulder harness induced loading from the backrest rail 68 nearest the harness to the opposite backrest rail 70 in the forward facing static and dynamic test conditions. In contrast to existing seat designs that utilize torque tubes, the torque box 152 has a rectangular cross section that allows for a wider separation between headrest support brackets 168, particularly for a headrest utilizing longer brackets. Furthermore, the torque box 152 provides sufficient space to house an inertial reel (not shown), electric headrest mechanism (not shown) and longer headrest support brackets 168.

When in operation, as the seat back reclines, there is a tendency for the unsupported side of the seat back 18 to drop away from the seat occupant. The torque box 152, which can be used with both electric and non-electric type headrests, prevents this from happening because the torque box 152 is attached to each backrest rail 68, 70, as shown in FIGS. 23–29, thereby providing support for both sides of the seat back 18. Furthermore, the square bottom shape of the torque box 152 allows the bottom edge of the seat back 18 to track around the rear edge of the bottom cushion while the seat back 18 is reclining, thereby eliminating the gap between the seat back 18 and the bottom cushion.

Figure 22:
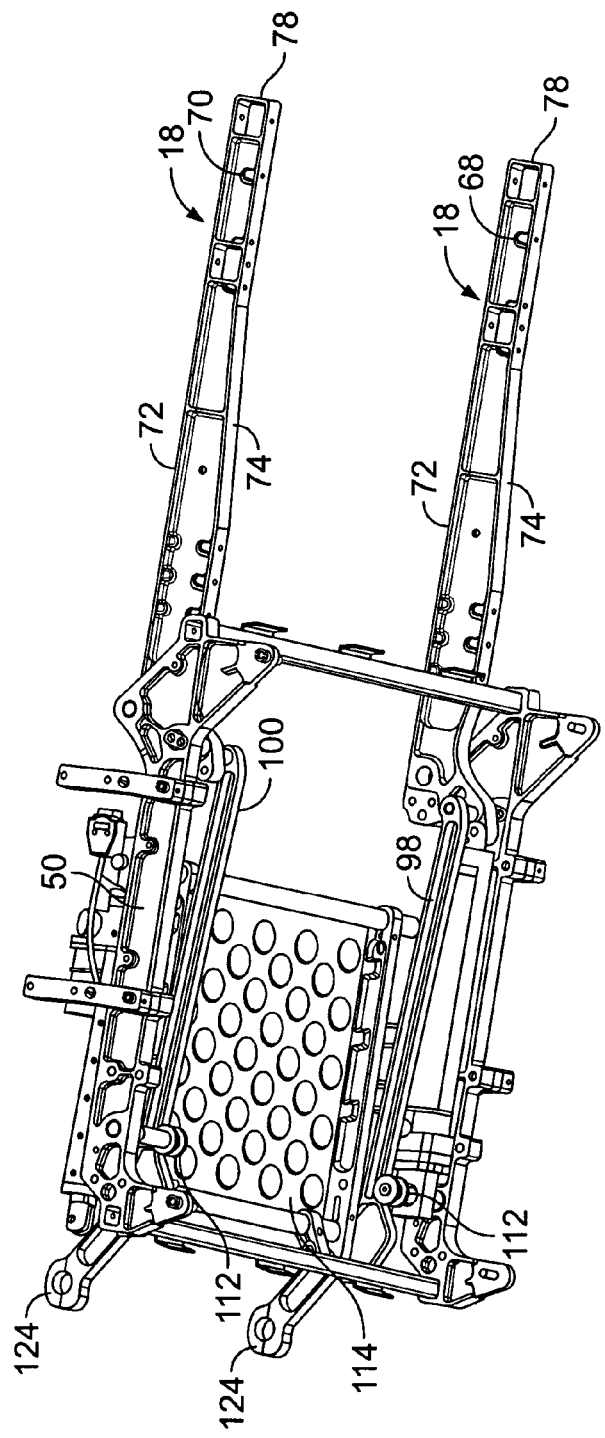
FIG. 22 is a perspective view of the underside of the seat frame, seat pan, and the backrest rails when the seat back is in the fully horizontal reclined position.
Figure 23:
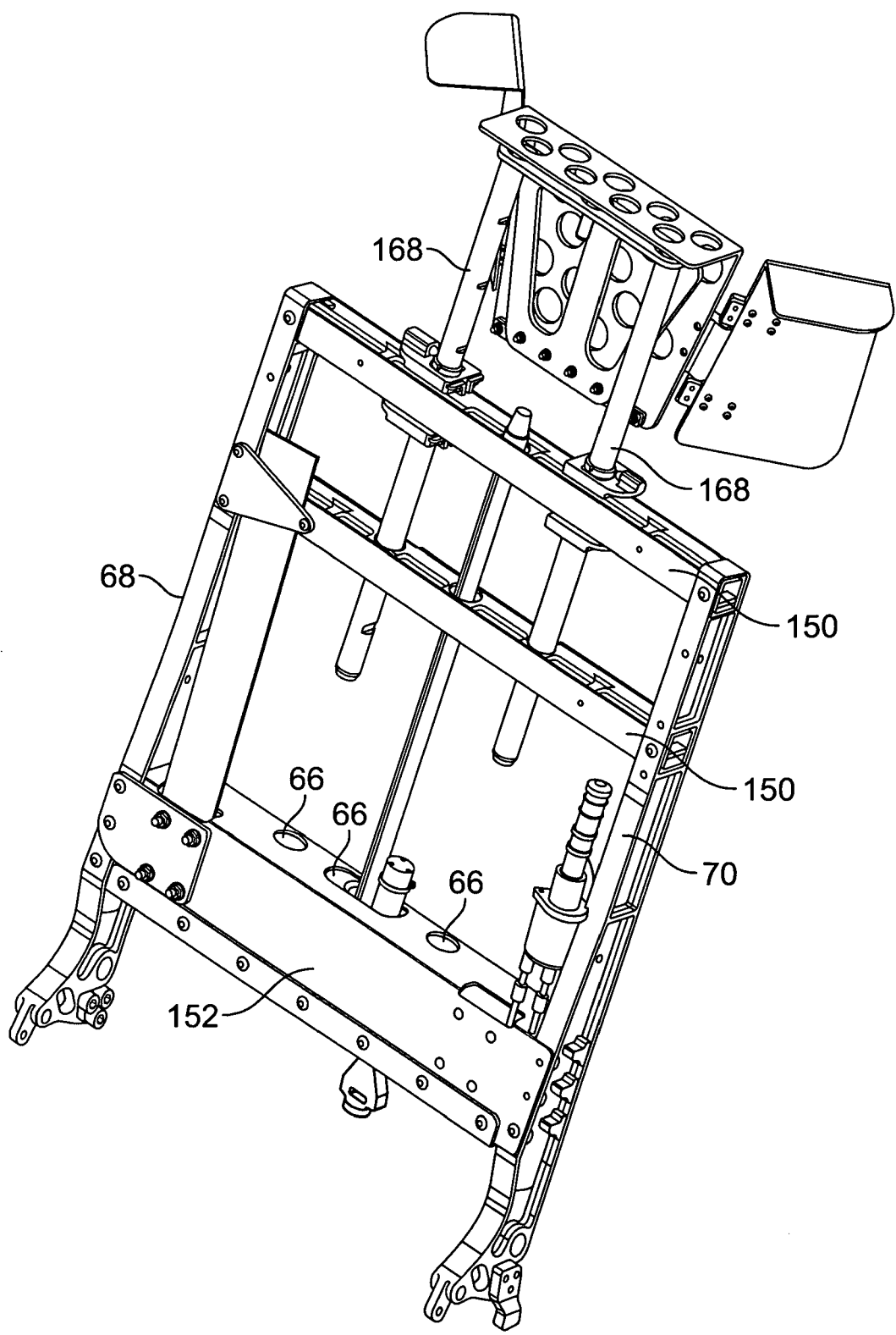
FIG. 23 is a perspective view showing the frame of the seat back.
Figure 24:
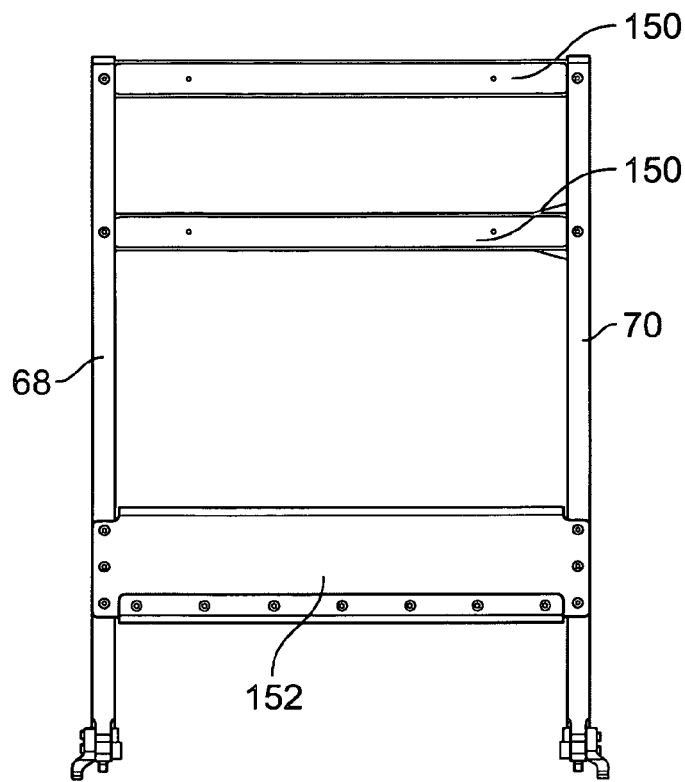
FIG. 24 is a front view of the seat back frame showing the backrest rails, support beams and torque box.
Figure 25:
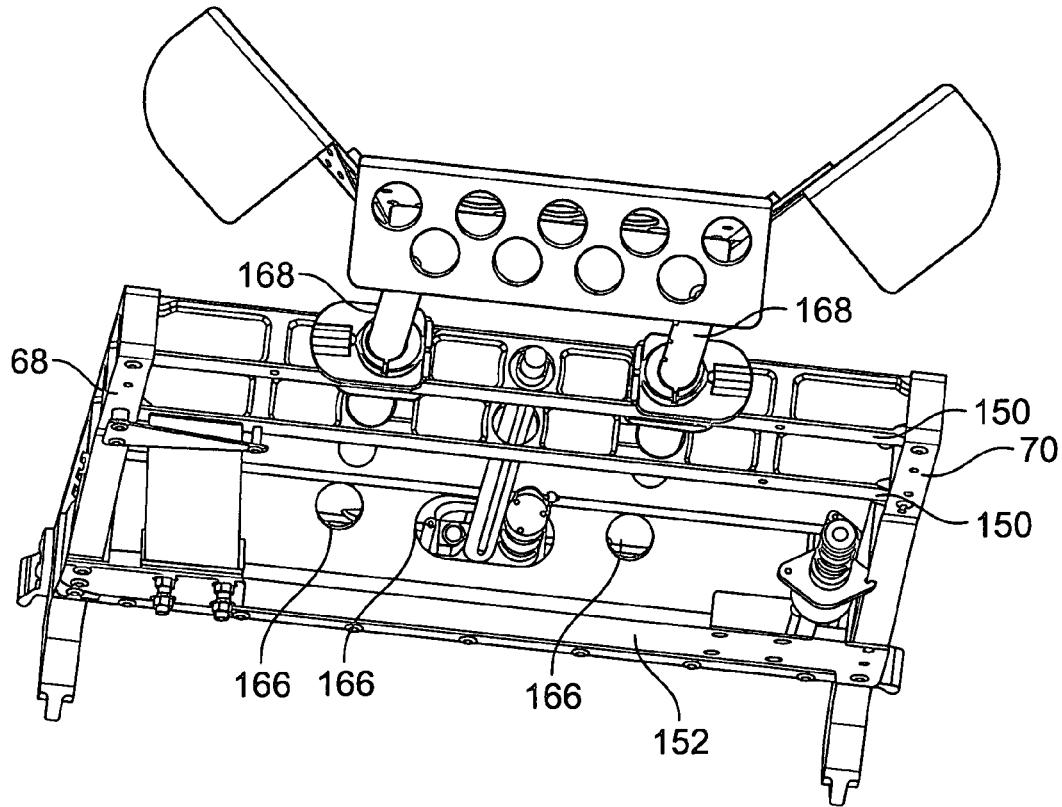
FIG. 25 is a perspective view of the top of the seat back assembly.
Figure 26:
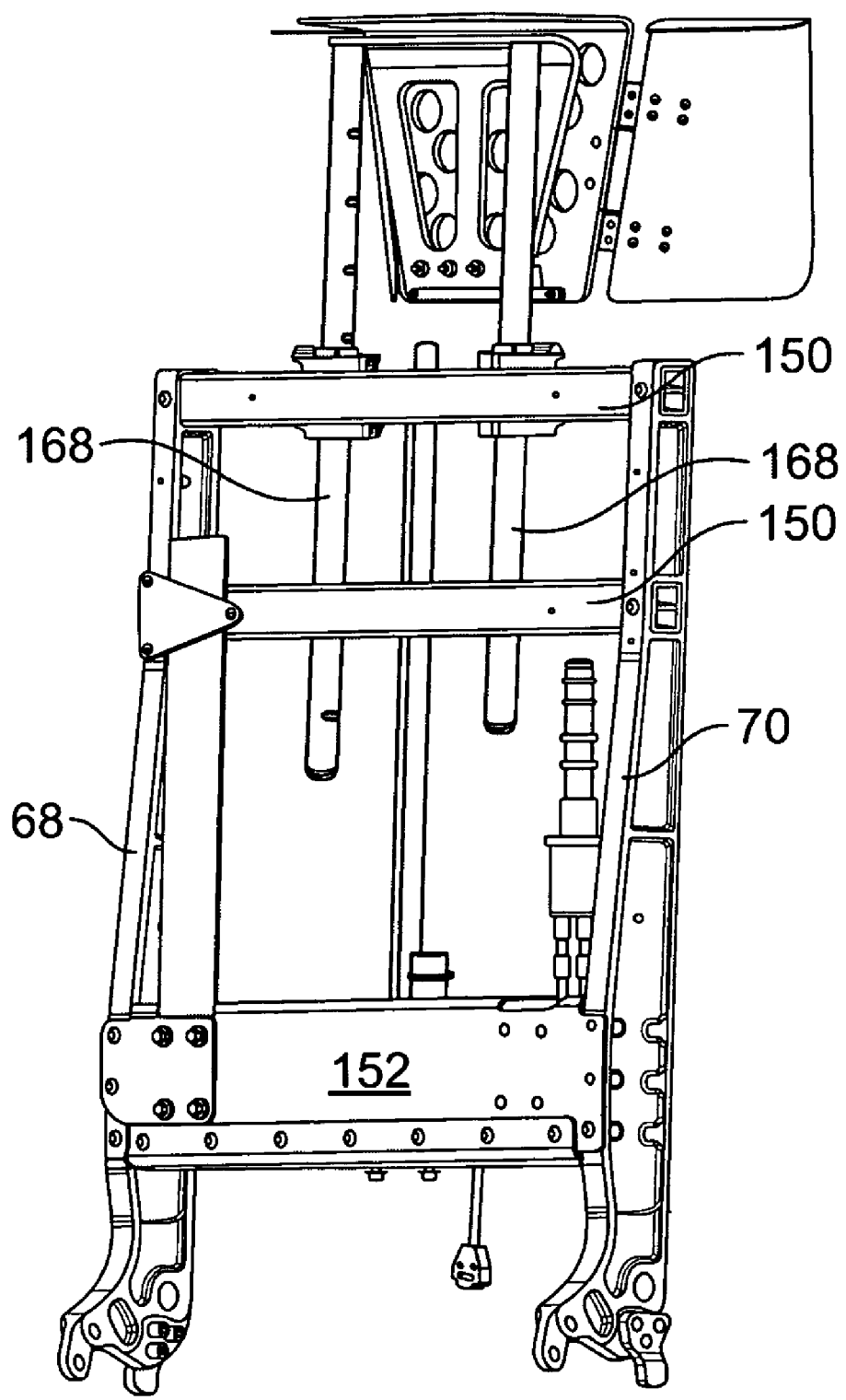
FIG. 26 is a perspective view of the seat back assembly.

FIGS. 1–2, 16 and 17 show a chair 10 that includes a seat articulator 96 that has a first and second ramp bar 98, 100 separated from and substantially parallel to one another. Each of the ramp bars 98, 100 has a first end, 102 and a second end 104 with a ramp portion 106 there between them. Each ramp portion 106 has an incline portion 108 and a decline portion 110. As shown in FIG. 22, the second end 104 of each ramp bar 98 is positioned on a roller 112 attached to the seat frame 14 while the first end 102 of each ramp bar 98 is attached to the seat back 18 and the seat frame 14. In one version of the embodiment, the ramp 106 may be located proximal to the second end 104 of the ramp bar 98.

Figure 18:
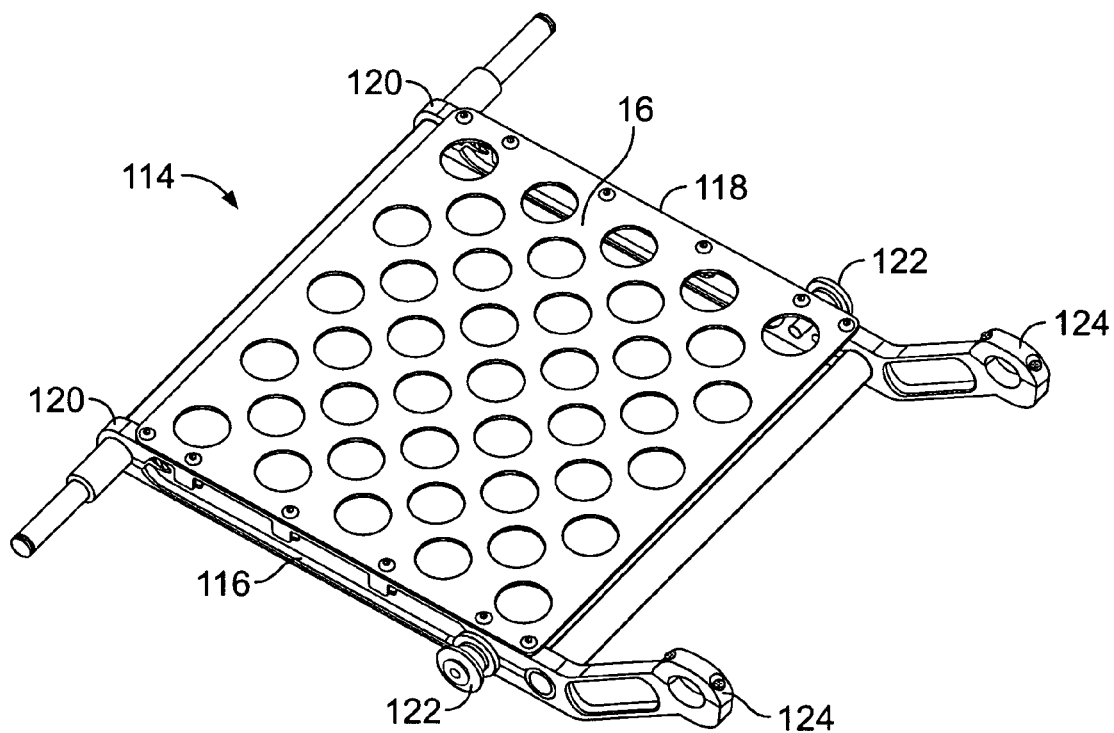
FIG. 18 is a perspective view of the seat pan.
Figure 20:
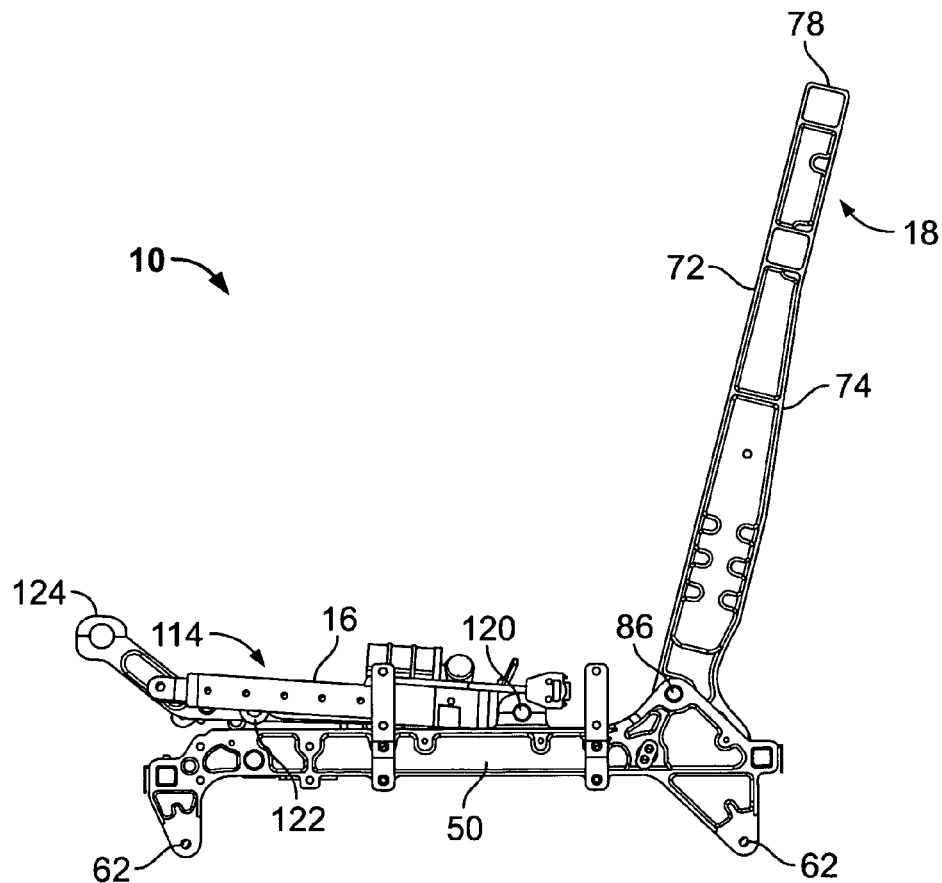
FIG. 20 is a side view of the side rail of the seat frame, seat pan, and the backrest rail when the seat back is in the upright position.

A seat pan 114 which is positioned on the seat pan articulator 96 has a first and second side 116, 118 spaced apart from and substantially parallel to each other, as shown in FIG. 18. Each side of the seat pan 114 has a first end 120 that is connected to the seat frame 14, as shown in FIG. 20, and a roller 122 attached proximal to a second end 124, as shown in FIG. 18. These rollers 122 are positioned on the respective ramp bars 98, 100, as shown in FIG. 20.

When in a neutral, upright position, as shown in FIG. 20, the seat back 18 is oriented approximately 14° from the vertical. When in operation, the seat back 18 is reclinable using any known mechanical or electrical system. As the seat back 18 reclines from 14° to approximately 52°, the seat pan 114 correspondingly raises to create a "cradled" position. This results from the ramp bars 98, 100 moving forward as the seat back 18 reclines, thereby raising the seat pan 114 as the ramp portion 106 rides up the roller 122. As shown in FIG. 20, after approximately 52°, the rollers 122 reach the apex of the ramp portion 106 and begin rolling down the ramp. This causes the ramp bars 98, 100 to continue to move forward as the seat back 18 reclines further. This allows the seat pan 114 to move back to the horizontal position where the occupant achieves a fully berthed seat condition with the seat at a full recline position 90° from the vertical, as shown in FIGS. 21 and 21.

Figure 19:
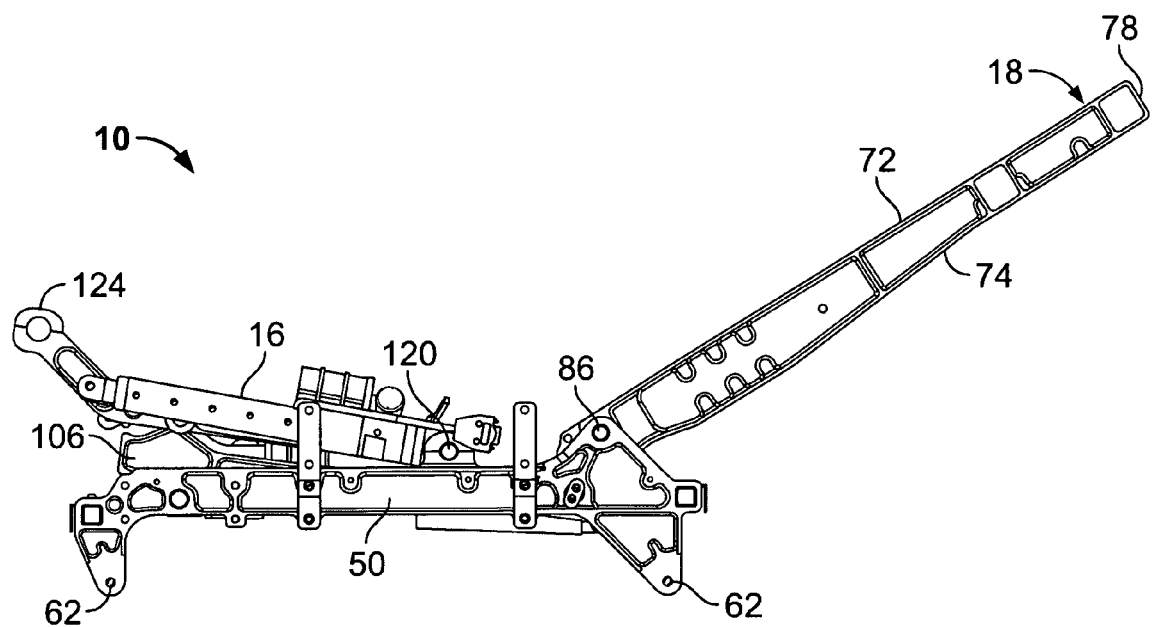
FIG. 19 is a side view of the side rail of the seat frame, seat pan, and the backrest rail when the seat back is in the 52° cradle position.
Figure 21:
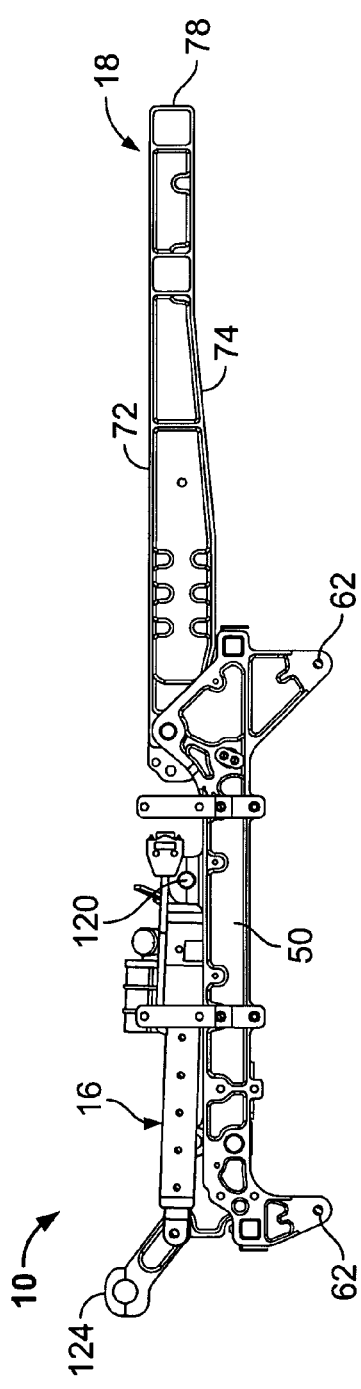
FIG. 21 is a side view of the side rail of the seat frame, seat pan, and the backrest rail when the seat back is in the fully horizontal reclined position.

As can be seen from FIGS. 19–22, the seat has three transition points as it travels through approximately 76° of rotation so as to achieve a truly horizontal position when the seat is fully reclined. These transition points are the upright position where the seat back is approximately 14° from the vertical, as shown in FIG. 19, the midway or "cradled" position at 52° from the vertical, as shown in FIG. 20, and the fully flat bed position where both the seat back and the seat pan are 90° from the vertical, as shown in FIGS. 21 and 22. When the seat back 18 reclines, the occupant's weight tends to have a horizontal aft component and his back a vertical forward component. These two forces balance each other out causing one to adhere to the seat. The further the seat back 18 reclines, the more lift is generated as the back moves from an upright position generating a forward component, to a more horizontal position, thereby increasing the vertical component. By articulating the seat pan, the horizontal aft component of the seat becomes more downward, thereby offsetting the increased vertical component of the reclined seat back.

A fully horizontal position can be achieved because, as shown in FIGS. 7–11 and 19–22, the location of the pivot axis has been advanced forward towards the leading edges of the backrest front edge so as to minimize any gaps or mismatches of the backrest and the bottom cushions of the chair during full recline. This location of the pivot point eliminates the requirement for a seat pan lifter to align the surface of the bottom cushion with the surface of the back cushion when using the chair as a bed.

As shown in FIGS. 10 and 11, the seat back pivot arm 82 is capable of providing a mechanical advantage during the inclining of the seat from a full recline position. This is because by lengthening the pivot arm 82, a longer moment arm is provided that, in the reclined position, provides for a stronger restoring moment to the seat back as the seat is returned to the upright position. This eliminates the need for the occupant to pull the seat back to the upright position.

Figure 30:
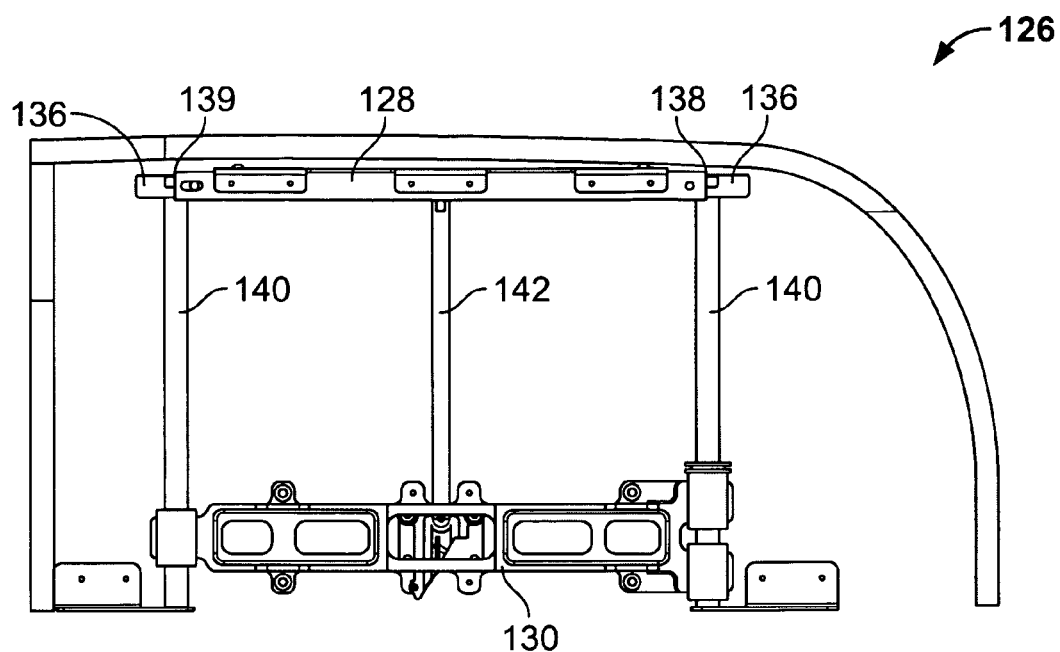
FIG. 30 is a side view of the arm rest assembly.
Figure 31:
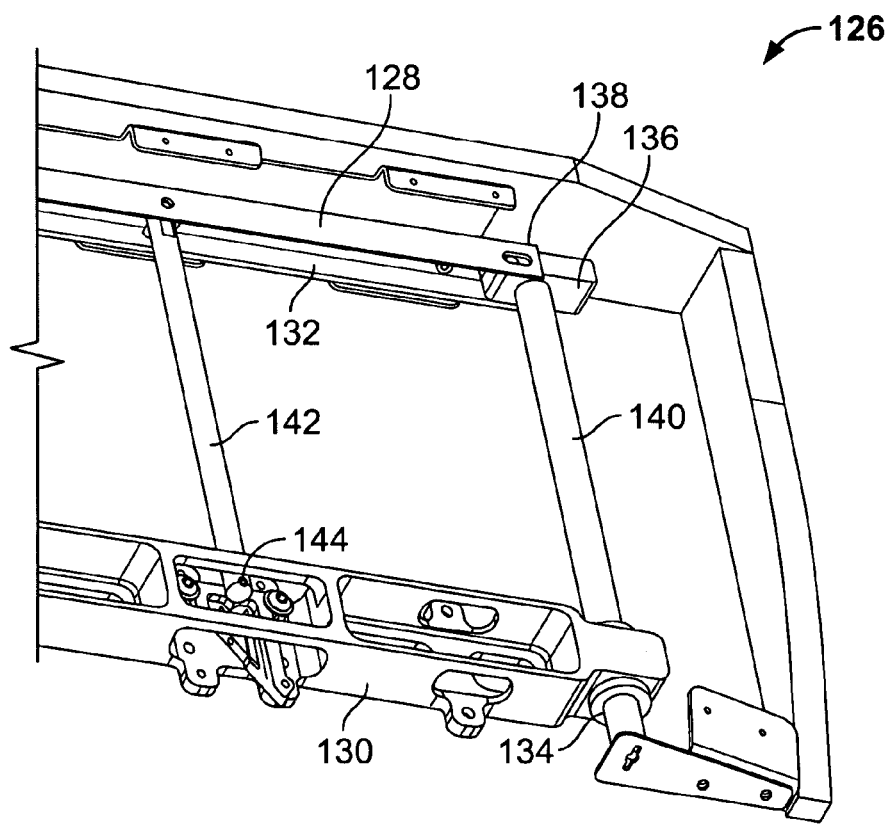
FIG. 31 is a perspective view of the arm rest assembly.
Figure 33:
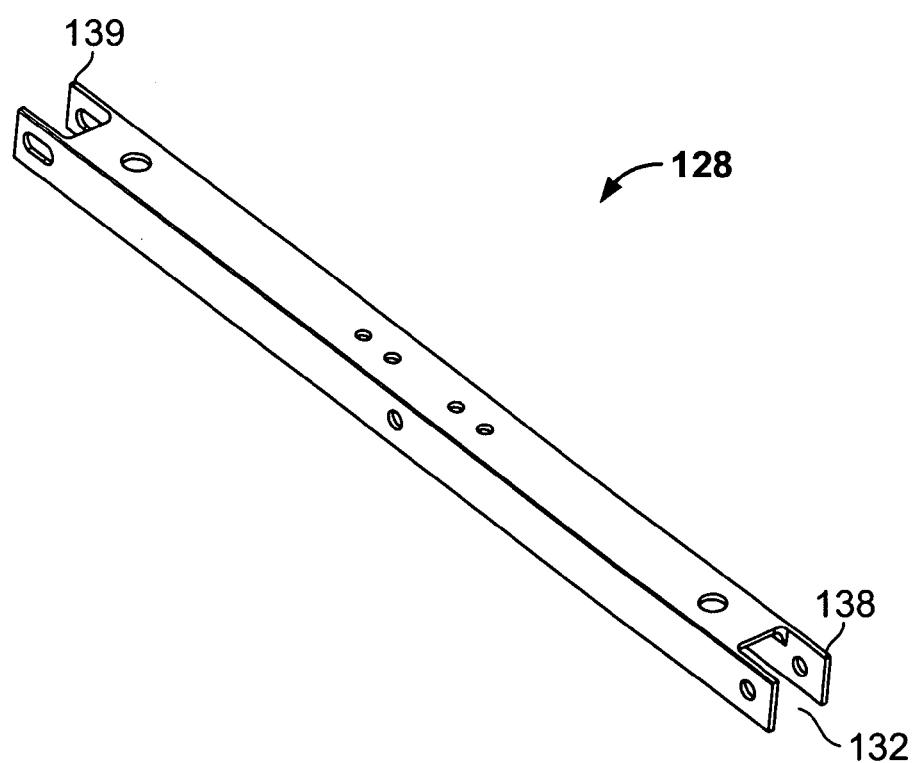
FIG. 33 is a perspective view of the top support frame used in the arm rest.
Figure 38:
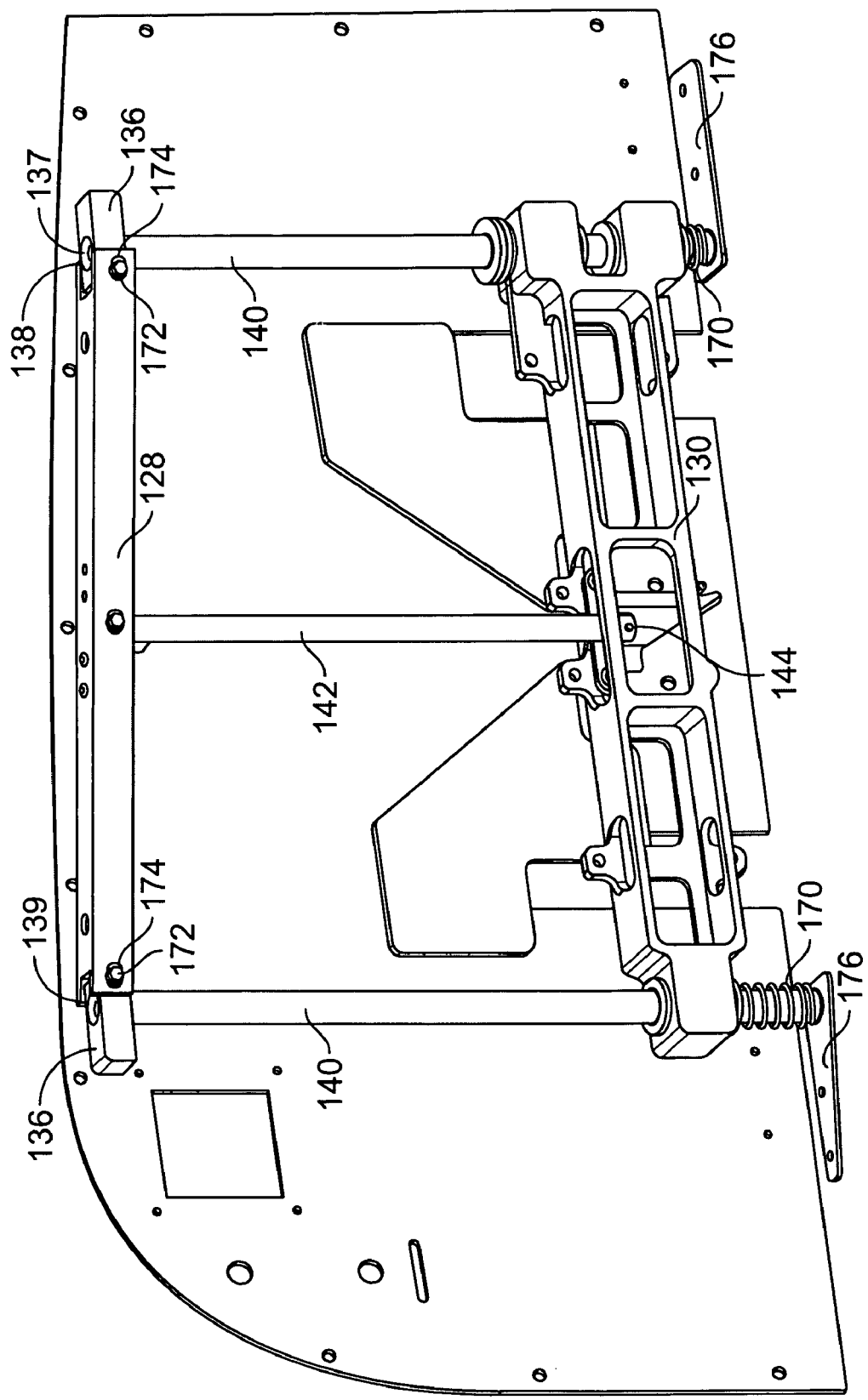
FIG. 38 is a perspective view of the components of the arm rest assembly showing support brackets of approximately equal length.
Figure 39:
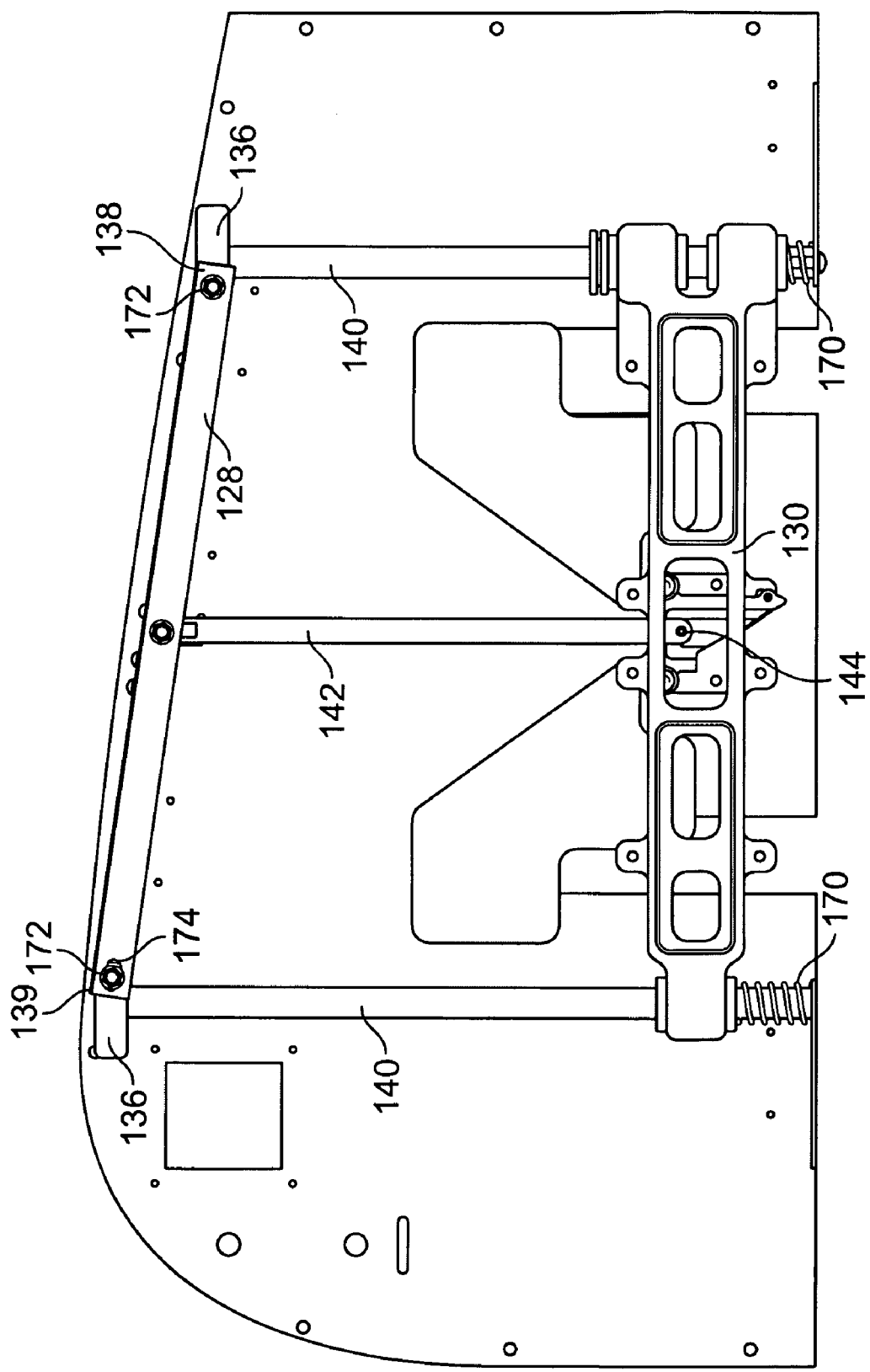
FIG. 39 is a side view of the components of the arm rest assembly showing support brackets of different length.
Figure 40:
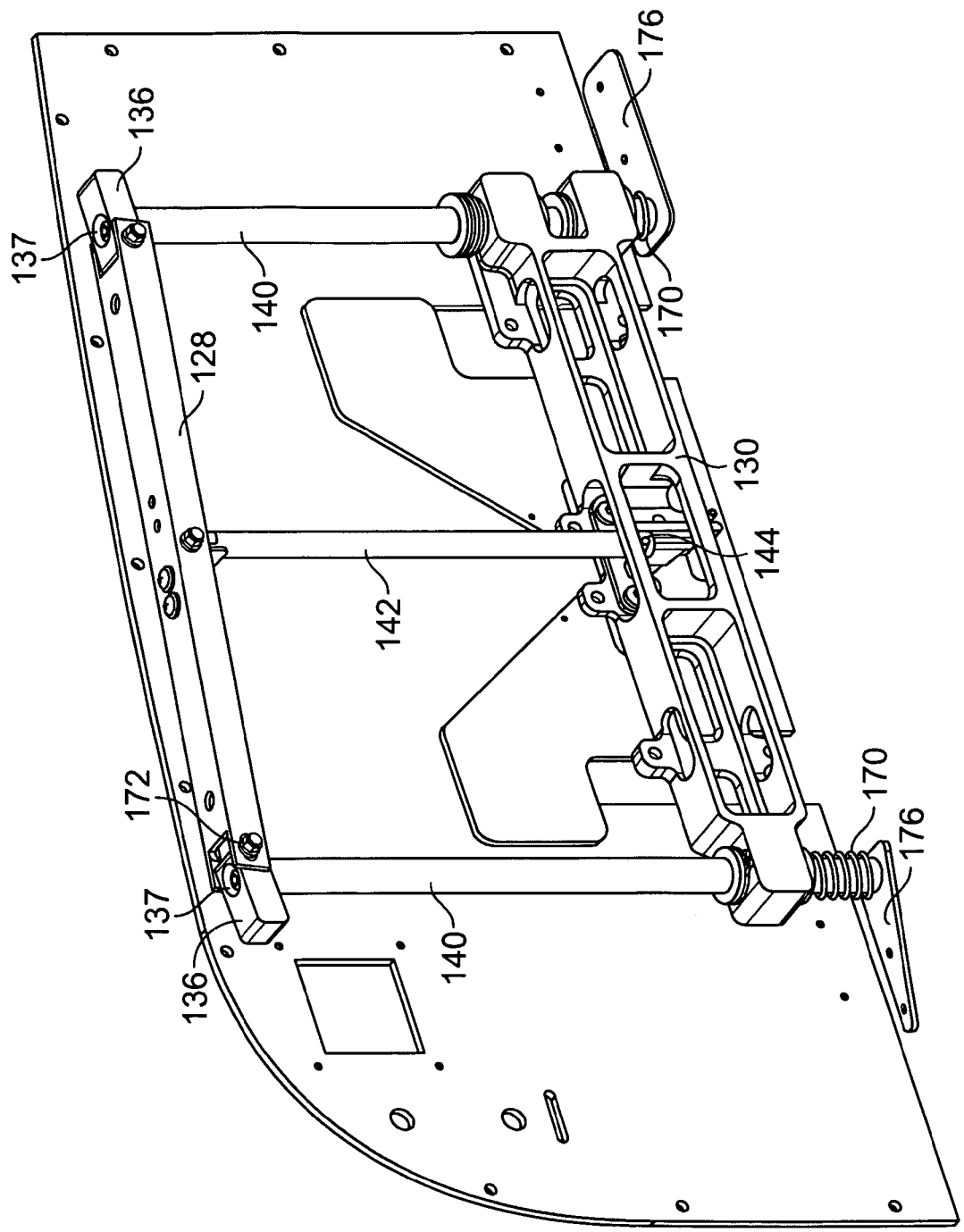
FIG. 40 is a perspective view of the components of the arm rest assembly.
Figure 41:
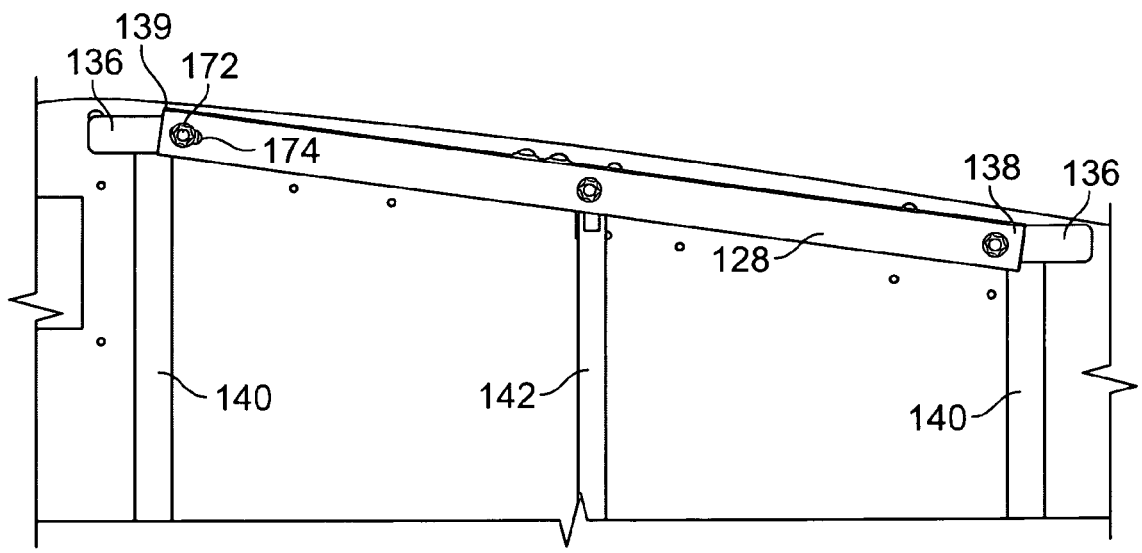
FIG. 41 is a perspective view of the top support frame of the arm rest assembly showing the mounting blocks attached at each end.
Figure 42:
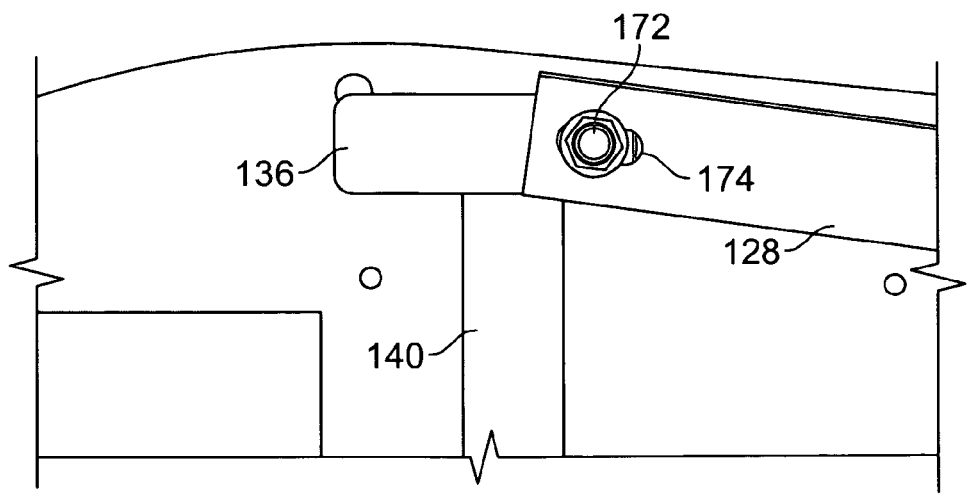
FIG. 42 is a close-up perspective view of the mounting block attachment point.

In another embodiment, the invention involves a chair 10 comprised of a base assembly 12, a seat frame 14 located above the base assembly 12, a seat 16 and seat back 18 are attached to the seat frame 14. Additionally, an arm rest 126, as shown in FIGS. 30, 38, 39 and 40, is attached to the seat frame 14, wherein the arm rest 126 includes a top and bottom support frame 128, 130 separated from one another, as shown in FIGS. 30 and 31. The top support frame 128, as shown in FIGS. 30, 31 and 33, may define a channel 132 proximal to the bottom support frame 130. A mounting block 136 is pivotally attached at one end of the top support frame 128 and a support bracket 140 is attached to the mounting block 136 and connected to the bottom support frame 130. A spring 170 is attached to an end of the support bracket 140 connected to the bottom frame 130, as shown in FIGS. 38, 41 and 42.

Figure 34:
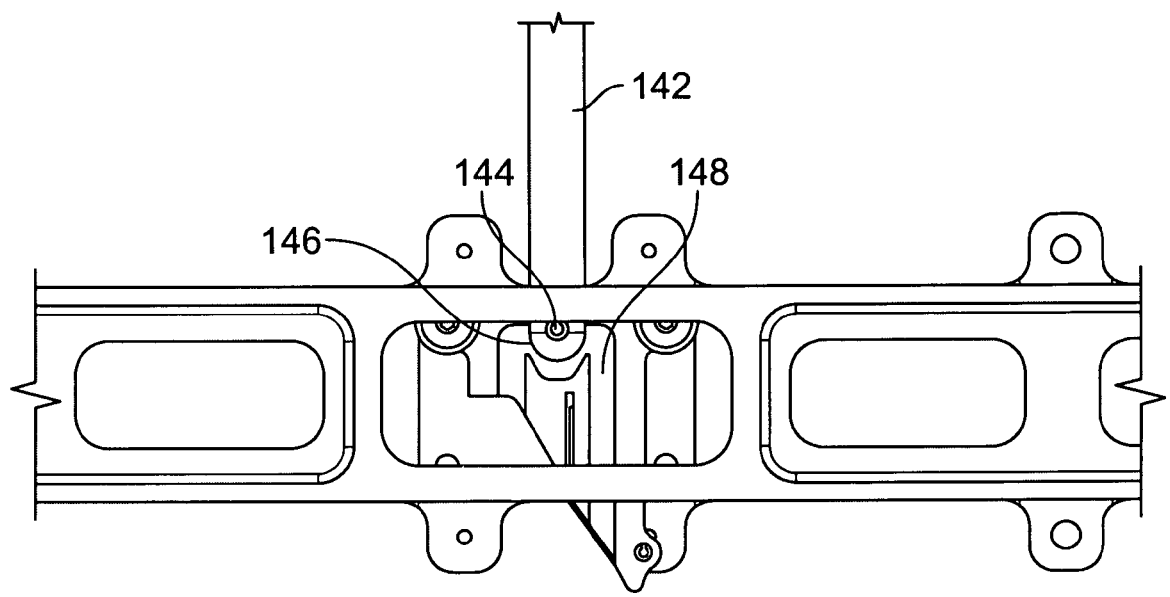
FIG. 34 is a close-up view of the guide slot positioned in the bottom support frame.
Figure 36:
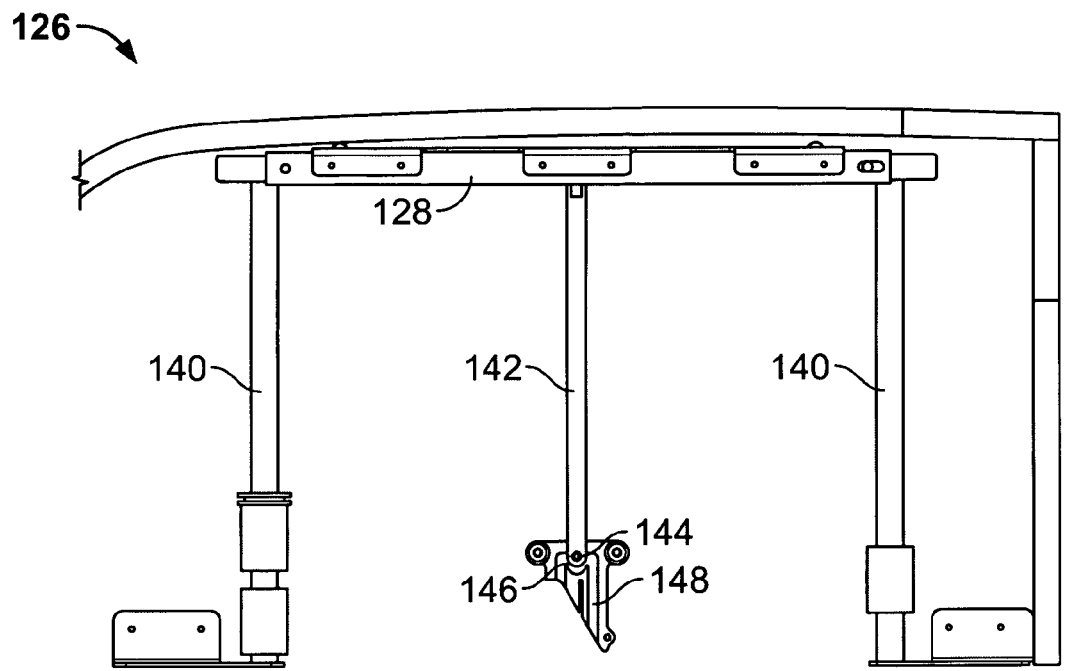
FIG. 36 is a side view of the arm rest assembly without the bottom support frame.

As shown in FIGS. 30, 31 and 36, 38, 39, 40, and 41, a positioning member 142 extends from the top support frame 128. The positioning member 142 has a guide pin 144 that extends from an end 146 distal to the top support frame 128. A guide slot 148 that is capable of receiving the guide pin 144 is attached to the bottom support frame 130, as shown in FIGS. 34 and 36.

Figure 35:
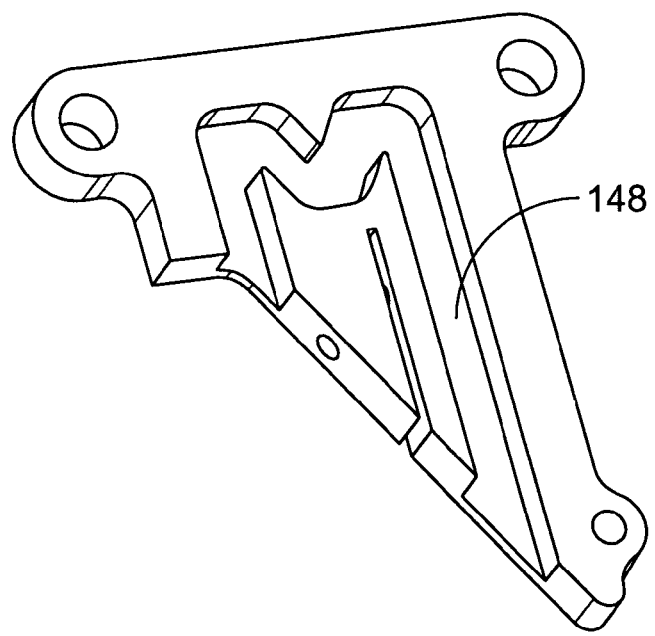
FIG. 35 is a perspective view of the guide slot.

The chair 10, described in accordance with this invention, may be suitable for use as a passenger seat in any vehicle including, without limitation, an aircraft, bus or mobile home. In one embodiment, the top and bottom support frames 128, 130 of the arm rest 126 may be substantially parallel to each other. Furthermore, the guide slot 148 may be in the shape of the letter M, as shown in FIG. 35, and may be manufactured using a plastic-like material.

Figure 32:
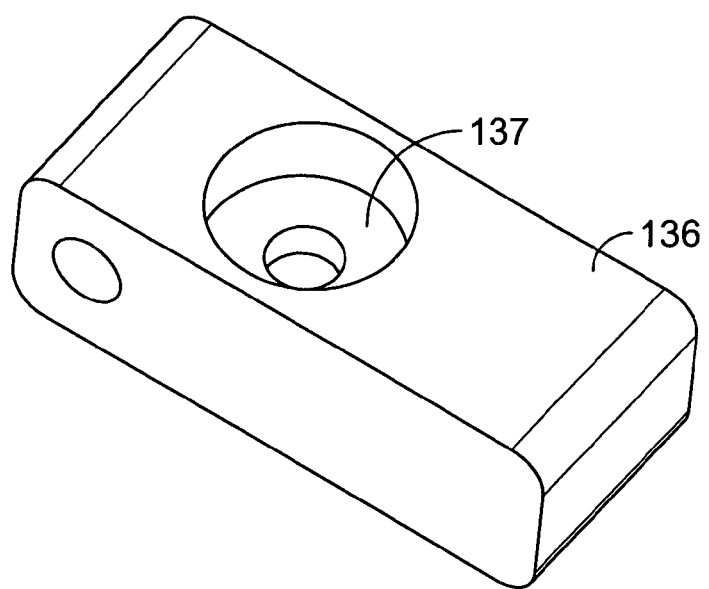
FIG. 32 is a perspective view of the mounting block.
Figure 37:
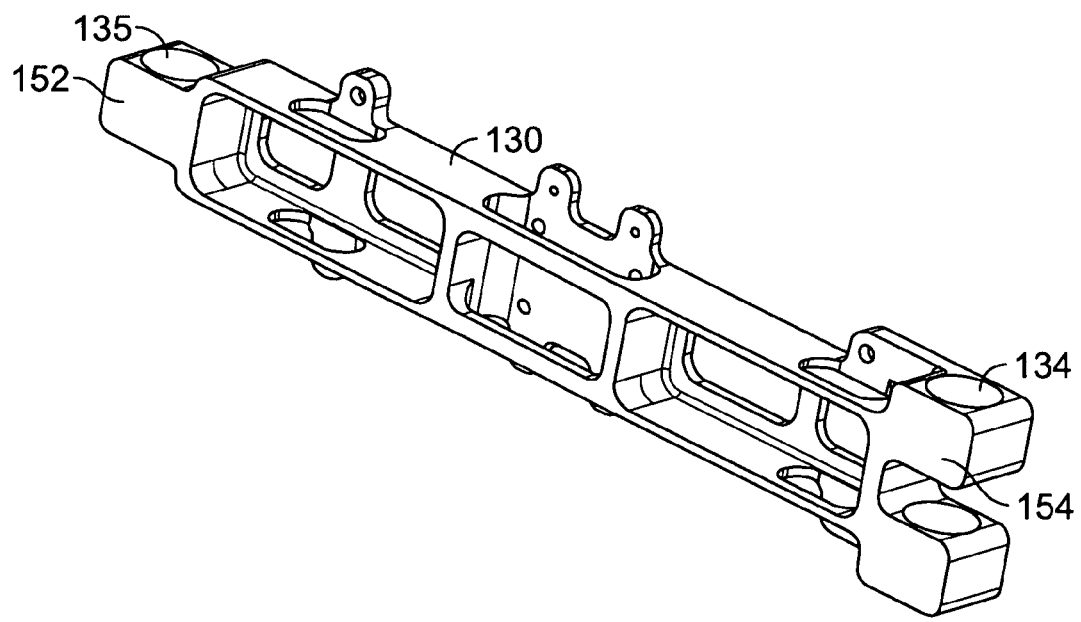
FIG. 37 is a perspective view of the bottom support frame.

In one embodiment, the mounting block 136, as shown in FIG. 32, and the bottom support frame 130, as shown in FIGS. 31 and 37, each define an opening 137, 134, respectively. In this embodiment, one end of the support bracket 140 is received in the opening 137 in the mounting block 136, while a second end is received in the opening 134 in the bottom support frame.

In one embodiment, the top support frame 128 has a first end 138, and a second end 139. A mounting block 136 is pivotally connected at each of the first and second ends 138, 139. As shown in FIG. 37, the bottom support frame 130 also has a first and a second end 152, 154 with an opening 134, 135 at each end. A support bracket 140 is attached to the respective mounting block 136 at each end 138, 139 of the top support frame, the support brackets 140 extend, respectively, through the opening 134, 135 at each end of the bottom support frame 130, thereby connecting the top support frame 128 to the bottom support frame 130, as shown in FIGS. 30 and 31.

When in use, the guide pin 144 is positioned in the nadir of the v-shaped portion of the M-shaped guide slot 148. By lifting up on the arm rest 126, an occupant can lift the guide pin 144 off of the nadir and guide the pin 144 up the slots to the top of the leg portion of the M. The occupant then lowers the arm rest 126 and the guide pin 144 travels down the respective leg of the M to a new, lower position. During this movement, the spring 170 acts as a dampener to prevent various components of the arm rest 126, in particular the bottom support frame 130 and the mounting plate 176 from slamming together.

As can be seen from FIG. 35, one leg of the M can be shorter than the other, thereby allowing for an intermediate height position for the arm rest 126.

The bottom support frame 130, which is attached to the seat frame 14, may be a CNC machined guide and the M-shaped guide slot 148 may be manufactured of plastic-like material, thereby reducing the amount of noise caused by the movement of the arm rest 126.

The structure of the arm rest 126 allows for the manufacture of arm rests 126 having various profiles as one is able to vary the height of the support brackets 140 in order to adjust the angle of the top support frame 128. This is accomplished by pivoting the mounting block 136 about its attachment point 172 in the opening or slot 174 in the top support frame 128, as shown in FIGS. 41 and 42.

Because, in one embodiment, the sides of the top support frame 128 extend beyond the top surface, as shown in FIG. 33, the mounting block 136 is free to pivot up and down to accommodate the lengthening or shortening of the support bracket 140. This allows one to change the profile of the arm rest 126, as shown in FIGS. 38, 41 and 42.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A chair comprising:
   a base assembly;
   a seat frame located above the base assembly;
   a seat attached to the seat frame;
   a seat back including a first backrest rail and a second backrest rail;
   a torque box extending between the first and second backrest rails, the torque box including a first square U-shaped channel member and a second square U-shaped channel member, wherein the first and second square U-shaped channel members are positioned opposite each other so that two sides of one of the first and second square U-shaped channel members are received in the channel of the other one of the first and second square U-shaped channel members; and
   at least one pivot member including a seat belt anchor located at one end, wherein the at least one pivot member extends through the seat frame and the seat back to pivotally connect the seat back to the seat frame.

2. The chair of claim 1 wherein the at least one pivot member further comprises a threaded portion proximate the seat belt anchor.

3. The chair of claim 2 further comprising:
at least one washer disposed on the at least one pivot member; and
a jam nut installed on the threaded portion.

4. The chair of claim 1 wherein the
first backrest rail includes a first end having an aperture configured to receive the at least one pivot member, a second end distal from the first end, a front edge extending between the first end and the second end, a back edge extending between the first end and the second end, and a pivot arm including a first portion extending generally perpendicular from the back edge at the first end and a second portion extending from the first portion past the first end; and wherein the
second backrest rail is substantially similar to the first backrest rail, the first and second backrest rails being spaced apart to define a width of the seat back.

5. The chair of claim 4 wherein the at least one pivot member is configured to extend through a side rail of the seat frame and the aperture of at least one of the first and second backrest rails.

6. The chair of claim 5 wherein the at least one pivot member further comprises a threaded portion proximate the seat belt anchor, the threaded portion configured to extend through the side rail of the seat frame.

7. The chair of claim 6 further comprising:
first and second washers disposed on the at least one pivot member and sandwiching at least one of the first and second backrest rails; and
a jam nut installed on the threaded portion.

8. The chair of claim 4 wherein the torque box is configured proximate the first end of the first backrest rail and the first end of the second backrest rail.

9. The chair of claim 1 wherein the torque box has a generally rectangular-shaped cross section.

10. The chair of claim 1 wherein at least one of the first square U-shaped channel member and second square U-shaped channel member includes apertures configured to receive a headrest support bracket.

11. A chair comprising:
a base assembly;
a seat frame located above the base assembly, the seat frame including a first side rail and a second side rail spaced apart from the first side rail;
a seat attached to the seat frame;
a reclinable seat back,
wherein the reclinable seat back includes a first backrest rail pivotally connected to the first side rail and a second backrest rail pivotally connected to the second side rail, each of the first and second backrest rails including a first end proximate the seat frame, a second end distal from the first end, a front edge extending between the first end and the second end, a back edge extending between the first end and the second end, and a pivot arm including a first pivot arm portion extending generally perpendicular from the back edge at the first end and a second pivot arm portion extending from the first pivot arm portion past the first end; and
a torque box extending between the first and second backrest rails, the torque box including a first square U-shaped channel member and a second square U-shaped channel member, wherein the first and second square U-shaped channel members are positioned opposite each other so that two sides of one of the first and second square U-shaped channel members are received in the channel of the other one of the first and second square U-shaped channel members.

12. The chair of claim 11 further comprising at least one pivot member including a seat belt anchor, the at least one pivot member extending through at least one of the first and second backrest rails and at least one of the first and second side rails.

13. The chair of claim 12 wherein the at least one pivot member further comprises a threaded portion proximate the seat belt anchor.

14. The chair of claim 13 further comprising:
first and second washers disposed on the at least one pivot member and sandwiching at least one of the first and second backrest rails; and
a jam nut installed on the threaded portion.

15. A chair comprising:
a base assembly;
a seat frame located above the base assembly, the seat frame including a first side rail and a second side rail spaced apart from the first side rail;
a seat attached to the seat frame; and
a reclinable seat back,
wherein the reclinable seat back includes a first backrest rail pivotally connected to the first side rail, a second backrest rail pivotally connected to the second side rail, and a torque box connecting the first and second backrest rails, the torque box configured to transfer shoulder harness induced loading from one of the first and second backrest rail nearest a shoulder harness to the other backrest rail, and wherein the torque box includes a first square U-shaped channel member and a second square U-shaped channel member, wherein the first and second square U-shaped channel members are positioned opposite each other so that two sides of one of the first and second square U-shaped channel members are received in the channel of the other one of the first and second square U-shaped channel members.

16. A seat back for a reclining chair, the seat back comprising:
a first backrest rail;
a second backrest rail spaced apart from the first backrest rail; and
a torque box extending between the first and second backrest rails, the torque box including a first generally U-shaped channel member and a second generally U-shaped channel member,
wherein the first and second generally U-shaped channel members are positioned opposite each other so that two sides of one of the first and second generally U-shaped channel members are received in the channel of the other one of the first and second generally U-shaped channel members.

17. The seat back of claim 16 wherein each of the first and second backrest rails further comprises:
a first end proximate a seating portion of the reclining chair;
a second end distal from the first end;
a front edge extending between the first end and the second end;
a back edge extending between the first end and the second end; and
a pivot arm including a first pivot arm portion extending generally perpendicular from the back edge at the first end and a second pivot arm portion extending from the first pivot arm portion past the first end.

18. The seat back of claim 17 wherein the torque box is configured proximate the first end of the first and second backrest rails.

19. The seat back of claim 16 wherein the torque box has a generally rectangular-shaped cross section.

20. The seat back of claim 16 wherein at least one of the first generally U-shaped channel member and second generally U-shaped channel member includes apertures configured to receive a headrest support bracket.

* * * * *